United States Patent [19]
Iida

[11] Patent Number: 6,061,310
[45] Date of Patent: May 9, 2000

[54] DISK DRIVE AND METHOD OF CONTROLLING THE FOCUS

[75] Inventor: Michihiko Iida, Kanagawa, Japan

[73] Assignee: Sony Corporation, Tokyo, Japan

[21] Appl. No.: 09/064,259

[22] Filed: Apr. 22, 1998

[30] Foreign Application Priority Data

Apr. 22, 1997 [JP] Japan ................................ 9-104904

[51] Int. Cl.$^7$ .................................................. G11B 7/00
[52] U.S. Cl. ................................ 369/44.27; 369/44.29; 369/94
[58] Field of Search .................................. 369/43, 44.25, 369/44.26, 44.27, 44.28, 44.29, 44.35, 94, 54, 58

[56] References Cited

U.S. PATENT DOCUMENTS

| | | | |
|---|---|---|---|
| 5,263,011 | 11/1993 | Maeda et al. | 369/94 X |
| 5,740,136 | 4/1998 | Tsutsui et al. | 369/94 X |
| 5,793,721 | 8/1998 | Akkermans | 369/94 X |
| 5,999,503 | 12/1999 | Tateishi et al. | 369/94 X |

*Primary Examiner*—Paul W. Huber
*Attorney, Agent, or Firm*—Limbach & Limbach L.L.P.

[57] ABSTRACT

The invention provides an apparatus for reproducing data recorded on a disk-shaped storage medium including a plurality of signal layers, the apparatus being capable of switching the location of an objective lens through which a light beam is projected onto the disk-shaped storage medium, from a location where the objective lens focuses the light beam onto a first signal layer to a location where the objective lens focuses the light beam onto a second signal layer, the apparatus comprising: movement control means for moving the objective lens by outputting a movement control signal having a predetermined level at a predetermined time so that the objective lens can reach a location within a range which allows the objective lens to be drawn to a just focusing position associated with the second signal layer; velocity detection means for detecting the velocity of the objective lens from the waveform of a focusing error signal at a predetermined time prior to a zero-crossing time at which the objective lens is located at the just focusing position associated with the second signal layer; and focus drawing means for closing a focusing servo loop at a time corresponding to the above-described velocity. With the apparatus according to the invention, it is possible to perform the focus jumping operation in a reliable fashion regardless of conditions such as the position in which a disk drive is placed, the sensitivity variation of a biaxial driver, and the variation in the distance between layers of the disk.

12 Claims, 16 Drawing Sheets

DISK DRIVE AND METHOD OF CONTROLLING THE FOCUS

BACKGROUND OF THE INVENTION

1. Field of the Invention

The present invention relates to a disk drive adapted to operate in conjunction with a disk storage medium having a multilayer signal plane, and more particularly to an apparatus and method for controlling the focus of a light beam output from an optical head via its objective lens.

2. Description of the Related Art

In the art of disk storage media, in particular those which have been developed in recent years such as a DVD (digital versatile disk)-ROM, two-layer disks having two signal layers are known. FIG. 1 is a cross-sectional view illustrating an example of the two-layer disk structure.

As shown in FIG. 1, this two-layer disk 100 includes a disk substrate (transparent layer) 101 disposed on the surface side 108 of the disk and made of a transparent synthetic resin having a high light transmittance, high resistance to mechanical shocks, and high chemical resistance such as polycarbonate resin, polyvinyl chloride resin, or acrylic resin.

On the upper surface (on the upper side in FIG. 1) of the disk substrate (transparent layer) 101, there are provided a first signal plane 102 and a first reflection layer 103 corresponding to the first signal plane 102 wherein a first-layer data storage plane (signal layer) is formed with the first signal plane 102 and the first reflection layer 103. Furthermore, there are provided a second signal plane 103 and a second reflection layer 105 corresponding to the second signal plane 104, and a second-layer data storage plane (signal layer) is formed with the second signal plane 103 and the second reflection layer 105. On the second reelection layer 105, there is provided a bonding layer 106. A dummy plate 107 is bonded to the second reflection layer 105 via the connecting layer 106.

The first reflection layer 103 is made of a semitransparent film so that a fixed fraction of a laser beam is reflected by the first reflection layer 103. In the above-described structure, when the laser beam is focused on the first signal plane 102, the signal recorded on the first signal plane 102 is read from light reflected from the first reflection layer 103. When the laser beam is focused on the second signal plane 104, the laser beam passes through the first reflection layer 103 and is then focused on the second signal plane 104. In this case, the signal recorded on the second signal plane 104 is read from light reflected from the second reflection layer 105.

When a recording/reproducing operation is performed using a two-layer disk having the structure described above, it is required to switch the focal position, where the light emitted from an optical head via an objective lens is focused, from the first layer to the second layer or from the second layer to the first layer by switching the conditions of the focusing servo control so that the signal recorded/reproduced operation associated with the first layer is switched to that associated with the second layer or vice versa. The switching of the focal position is herein referred to as focus jumping. The control of the fucus jumping is described below with reference to FIG. 2.

FIG. 2 schematically illustrates the positional relationship between the two-layer disk 100 and the objective lens 2. In FIG. 2, there are shown two possible locations of the objective lens 2 on the surface side of the two-layer disk 100, wherein one location is represented by a solid line and the other is represented by a broken line. When the objective lens 2 is positioned at the location represented by the solid lines relative to the location of the two-layer disk 100, the light beam emerging from the objective lens 2 is focused within a range (first focus-drawing-in range FL1) which allows the objective lens to be drawn to a just focusing point associated with the first layer. If the focusing servo loop is closed in this situation, the location of the objective lens is converged to a location where the light beam is precisely focused on the first signal plane 102.

On the other hand, when the objective lens 2 is at the location represented by the broken line, the light beams is focused within a range (second focus-drawing-in range FL2) which allows the objective lens to be drawn to a just focusing point associated with the second layer. If the focusing servo loop is closed in this situation, the location of the objective lens is converged to a location where the light beam is precisely focused on the second signal plane 104.

When the focal point of the objective lens 2 is switched (jumped up) from the first layer to the second layer, the focus jumping operation is perform in such a manner that the focusing servo loop is opened when the focal point of the objective lens 2 is within the first focus-drawing-in range FL1, and a kick signal (acceleration signal) having a predetermined level is applied to a focus driver so that the objective lens 2 is moved upward (in FIG. 2) by a force applied to the objective lens 2 by the focus driver. In the above operation, the level of the kick signal is set to a value which allow the focal point of the objective lens 2 to move through the first layer into a second focus-drawing-in range FL2 of the second layer without exceeding the second focus-drawing-in range FL2.

At a proper time after that, the kick signal is turned off and a brake signal (deceleration signal) having a proper level is applied to the focus driver so that the objective lens 2 which was driven by the kick signal and which is now moving upward by means of inertia is decelerated.

As a result of the above operation, the objective lens 2 comes to a position within second focus-drawing-in range FL2 and the velocity of the objective lens 2 is reduced to a sufficiently low level by the deceleration given by the brake signal. At a proper time after that, the focusing servo loop is closed (to perform a focus drawing-in operation) thereby starting a focusing servo control operation by which the location of objective lens is converged to a location where the the light beam is focused on the second signal plane 104 of the second layer. In this way, the focal position of the objective lens 2 is switched from the first layer to the second layer.

By performing a similar focus jumping operation in an opposite direction, it is also possible to switch (jump down) the focal position of the objective lens 2 from the second layer to the first layer. In the jumping-down operation, the kick signal and the brake signal have a polarity opposite to that employed in the jumping-up operation.

A specific example of the focus jumping control is disclosed in U.S.patent application Ser. No. 691,136 filed by the present applicant (Jul. 24, 1996).

In practical applications, users do not always place their DVD disk drive or computer including a DVD disk drive in a horizontal position.

FIG. 3 illustrates some examples of positions in which a computer including a disk drive is placed. In the case of FIG. 3A, a computer 200 having a disk drive O disposed in the main part 201 of the computer 200 is placed in a horizontal position. In the case where the computer 200 is placed in such a manner, when a disk D is loaded into the disk drive O, the surface 108 (refer to FIG. 1) of the disk faces the bottom of the main part 201. The objective lens 2 of the optical head is located on the surface side of the disk and is moved in a direction along the height of the main part 201, as represented by an arrow A in FIG. 3, during the operation of controlling the focal point of the objective lens 2. That is, the objective lens 2 is moved in the vertical direction during the focusing control operation when the computer is placed as shown in FIG. 3A. In this case, the direction of the tracking control of the optical head, that is, the direction of the sled motion, is along the depth (denoted by an arrow B in FIG. 3) of the main part 201.

In the example shown in FIG. 3B, the computer is placed in a vertical position such that the left side of the main part 201 faces down. In the case of FIG. 3C, the computer is also placed in a vertical position but such that the right side of the main part 201 faces down. In the positions shown in FIGS. 3B and 3C, the surface of the disk D loaded in the disk drive O is along the vertical direction, and the focusing control of the objective lens 2 is performed in a horizontal direction as represented by arrows A.

In practical situations, users may place their computer in any of the positions shown in FIGS. 3A, 3B, and 3C. Therefore, it is desirable that the disk drive disposed in the computer be guaranteed to work normally in the recording/reproducing operation when the computer is placed in any of the positions shown in FIGS. 3A–3C.

However, a problem occurs in the focus jumping operation as described below, when the normal operation is guaranteed for any of the above positions of the disk drive.

For example, when the computer is placed in the horizontal position as shown in FIG. 3A, the motion of the objective lens 2 in the focus control direction (denoted by the arrow A) is influenced by gravity. More specifically, when the focal position is jumped up from one layer to the other layer, it is required to move the objective lens 2 against gravity. On the other hand, in the jumping-down operation, it is required to move the objective lens 2 in accordance with gravity.

If control parameters such as the absolute levels of the kick and brake signals, the application timing thereof, and the timing of closing the focusing servo loop are set so that the focus jumping-up operation can be performed in a reliable fashion on the assumption that the computer is placed in the horizontal position as shown in FIG. 3A, then for example the kick signal is set to a relatively high level so that the objective lens 2 can be moved from one layer to the other layer against gravity.

However, if the same control parameters optimized for the focus jumping-up operation are employed in the focus jumping-down operation, there is a high possibility that the focus jumping-down operation fails. That is, the objective lens 2 is kicked, by the kick signal having the relatively high level, in the same direction as the direction of gravity. As a result, the acceleration becomes greater than the optimum value, and the objective lens 2 cannot be decelerated properly in the braking operation following the accelerating operation. Therefore, when the servo loop is closed, the objective lens 2 is probably at a location outside the first focus-drawing-in range FL1 after being moved through the first focus-drawing-in range FL1.

Conversely, if the jumping-up operation is performed using the same control parameters as those optimized for the jumping-down operation, the acceleration of the objective lens 2 becomes smaller than the optimum value and the objective lens 2 does not reach the second focus-drawing-in range FL2. As a result, the objective lens 2 is drawn back into the first focus-drawing-in range FL1, and thus the focus jumping operation fails.

When the computer is placed in the horizontal position, as can be understood from the above discussion, it is required to set the kick and brake signals to different values depending on whether the jumping-up operation or the jumping-down operation is performed, and it is also required to properly set the timing of applying the kick and brake signals and the timing of closing the servo loop depending on the direction of the focus jumping operation.

On the other hand, when the computer is placed in the vertical position as shown in FIG. 3B or 3C, gravitation has no effect on the focus jumping operation regardless of the moving direction of the objective lens 2. However, when the levels of the kick and brake signals, the timing of applying the kick and brake signals, and the timing of closing the servo loop are set on the assumption that the computer is placed in the horizontal position as shown in FIG. 3A, if the computer is placed in the vertical position as shown in FIG. 3B or 3C and the focus jumping operation is performed using the control parameters determined on the assumption that the computer is placed in the horizontal position, there is a high possibility that the objective lens does not reach the desired focus-drawing-in range associated with the desired signal layer and is drawn back into the previous focus-drawing-in range or the objective lens exceeds the desired focus-drawing-in range and thus the focus jumping operation fails.

As can be understood from the above discussion, if the control parameters are set to fixed values, it is difficult to perform the focus jumping operation in a reliable fashion regardless of the position in which the computer is placed.

Even if it is possible to set the control parameters to fixed values so that high-reliable focus jumping operation can be performed regardless of the position in which the computer is placed, there are still other factors which can influence the focus jumping operation. Such factors include a sensitivity variation of a biaxial driver (focus driver and tracking driver) for driving the objective lens 2 and a variation in the distance between two layers of the two-layer disk. Thus it is very difficult to determine the parameters so that the focus jumping operation can be performed in a reliable fashion regardless of any factor.

If the focus jumping operation fails, the operation is repeated until a successful operation is achieved. This causes the user to wait for a long time.

SUMMARY OF THE INVENTION

In view of the above, it is an object of the present invention to provide a technique of performing a focus jumping operation in a reliable fashion regardless of any condition such as the position in which the computer is placed, the sensitivity variation of the biaxial driver (the focus driver and the tracking driver), and the variation in the distance between two layers of the two-layer disk.

According to an aspect of the present invention, there is an apparatus for reproducing data recorded on a disk-shaped storage medium including a plurality of signal layers, the apparatus being capable of switching the location of an objective lens through which a light beam is projected onto the disk-shaped storage medium, from a location where the objective lens focuses the light beam onto a first signal layer to a location where the objective lens focuses the light beam onto a second signal layer; the apparatus comprising: movement control means for moving the objective lens by outputting a movement control signal having a predetermined level at a predetermined time so that the objective lens can reach a location within a range which allows the objective lens to be drawn to a just focusing position associated with the second signal layer; velocity detection means for detecting the velocity of the objective lens from the waveform of a focusing error signal at a predetermined time prior to a zero-crossing time at which the objective lens is located at the just focusing position associated with the second signal layer; and focus drawing means for closing a focusing servo loop at a time corresponding to the above-described velocity.

In the apparatus according to the invention, the focus drawing means preferably operates in such a manner that: in the case where the velocity of the objective lens is within a normal range, the focus drawing means closes the focusing servo loop and turns off the movement control signal at a time corresponding to the zero-crossing time; in the case where the velocity of the objective lens is lower than the lower limit of the normal range, the focus drawing means closes the focusing servo loop and turns off the movement control signal when a predetermined length of time has elapsed from a predetermined time before the time corresponding to the zero-crossing time; and in the case where the velocity of the objective lens is higher than the upper limit of the normal range, the focus drawing means closes the focusing servo loop at the time corresponding to the zero-crossing time, and outputs a movement control signal having a predetermined level over a predetermined period of time thereby decelerating the objective lens.

In the apparatus according to the invention, the velocity detection means preferably detects the velocity of the objective lens on the basis of the period of time which ends at the time corresponding to the zero-crossing time of the focusing error signal and which begins at a time corresponding to the immediately previous zero-crossing time of the focusing error signal.

The velocity detection means may detect the velocity of the objective lens on the basis of differential information obtained by differentiating the waveform of the focusing error signal either during the period of time which ends at the tome corresponding to the zero-crossing time of the focusing error signal and which begins at a time corresponding to the immediately previous zero-crossing time of the focusing error signal or at a predetermined time during the above-described period of time.

According to another aspect of the invention, there is provided an apparatus for reproducing data recorded on a storage medium including a plurality of signal layers, the apparatus comprising:

moving means for moving an objective lens for focusing a laser beam onto the respective signal layers of the storage medium, in directions toward and away from the storage medium;

means for outputting a focusing error signal generated by detecting a laser beam reflected from the respective signal layers of the storage medium; and control means for controlling the moving means so that the objective lens is moved from a first location where the objective lens focuses the light beam onto a first signal layer of the storage medium to a second location where the objective lens focuses the light beam onto a second signal layer different from the first signal layer;

wherein the control means detects the velocity of the objective lens when the objective lens has come to a location near the second location on the basis of the focusing error signal generated during the movement of the objective lens from the first location to the second location, and the control means controls the timing of closing the focusing servo loop on the basis of the above-described velocity.

In the apparatus according to the invention, the control means preferably supplies a kick signal to the moving mean depending on a positive or negative focusing error signal generated first during the movement of the objective lens from the first location to the second location, thereby moving the objective lens toward the second location, and then the control means supplies a brake signal having a polarity opposite to that of the kick signal to the moving means, depending on a second focusing error signal generated immediately after the first focusing error signal and having a polarity opposite to that of the first focusing error signal.

In the above apparatus, the control means may determine whether an additional brake signal having a level higher than the level of the brake signal should be applied to the moving means, on the basis of the period of time during which the second focusing error signal is output.

The apparatus may further comprise comparing means for comparing the focusing error signal with a threshold level thereby detecting the focusing error signal having a positive or negative polarity, wherein the control means changes the threshold level depending on the time when the focusing error signal is output.

In the above apparatus, the control means may determine whether the focusing servo loop should be closed, on the basis of the period of time during which the second focusing error signal is output.

In the above apparatus, the control means may operate in such a manner that: in the case where the velocity of the objective lens is within the normal range, the control means closes the servo loop at the time when the level of the second focusing error signal becomes zero; in the case where the velocity of the objective lens is lower than the lower limit of the normal range, the control means closes the servo loop before the level of the second focusing error signal becomes zero; and in the case where the velocity of the objective lens is higher than the upper limit of the normal range, the control means closes the servo loop at the time when the level of the second focusing error signal becomes zero, and the control means further outputs an additional brake signal having a level higher than that of the brake signal during a predetermined period.

According to still another aspect of the present invention, there is provided a method of switching the location of an objective lens through which a light beam is projected onto a disk-shaped storage medium including a plurality of signal layers, from a location where the objective lens focuses the light beam onto a first signal layer to a location where the objective lens focuses the light beam onto a second signal layer, the method comprising the steps of: outputting a movement control signal having a predetermined level at a predetermined time thereby moving the objective lens toward a range in which the objective lens is allowed to be drawn to a just focusing position associated with the second signal layer; detecting the velocity of the objective lens from the waveform of a focusing error signal at a predetermined time prior to a zero-crossing time at which the objective lens is located at the just focusing position associated with the second signal layer; and closing a focusing servo loop at a time corresponding to the velocity.

Preferably, the step of closing the focusing servo loop is performed in such a manner that: in the case where the velocity of the objective lens is within a normal range, the focusing servo loop is closed and the movement control signal is turned off at a time corresponding to said zero-crossing time; in the case where the velocity of the objective lens is lower than the lower limit of the normal range, the focusing servo loop is closed and the movement control signal is turned off when a predetermined length of time has elapsed from a predetermined time before the time corresponding to the zero-crossing time; and in the case where the velocity of the objective lens is higher than the upper limit of the normal range, the focusing servo loop is closed at the time corresponding to the zero-crossing time, and a movement control signal having a predetermined level is output over a predetermined period of time thereby decelerating said objective lens. With the above apparatus and method, in the operation of jumping the focal position from one layer to another layer of a multilayer disk, when the focal position comes to a position within the focus-drawing-in range associated with the destination layer, it is possible to draw the objective lens to a just focusing point associated with the destination layer by controlling the velocity of the objective lens in accordance with the velocity of the objective lens approaching the just focusing point associated with the destination layer.

DESCRIPTION OF THE PREFERRED EMBODIMENT

Figure 1:
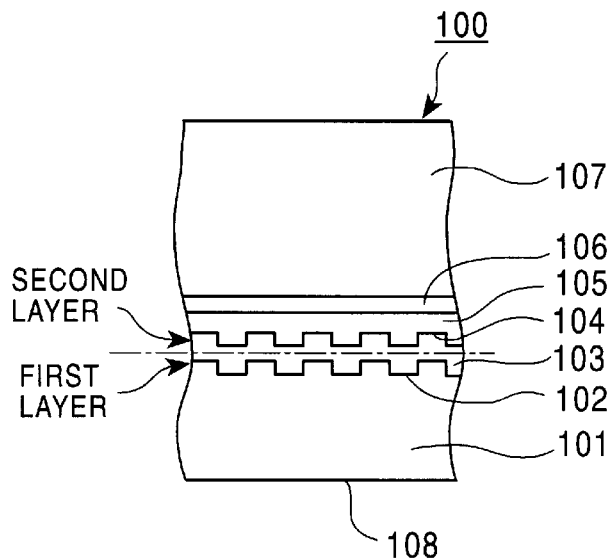
FIG. 1 is a cross-sectional view illustrating an example of the structure of a two-layer disk.

The present invention is described in further detail below with reference to a preferred embodiment. In the embodiment described below, it is assumed that a focusing servo control apparatus is provided in a disk drive capable of reproducing data not only from a DVD-ROM of the common type, that is, a disk of the one-layer type, but also from a two-layer disk having the structure shown in FIG. 1. Although the disk drive according to the present invention may be used separately, it is assumed in the following description that the disk drive is installed in a computer.

The embodiment is described in terms of items listed below.

Figure 4:
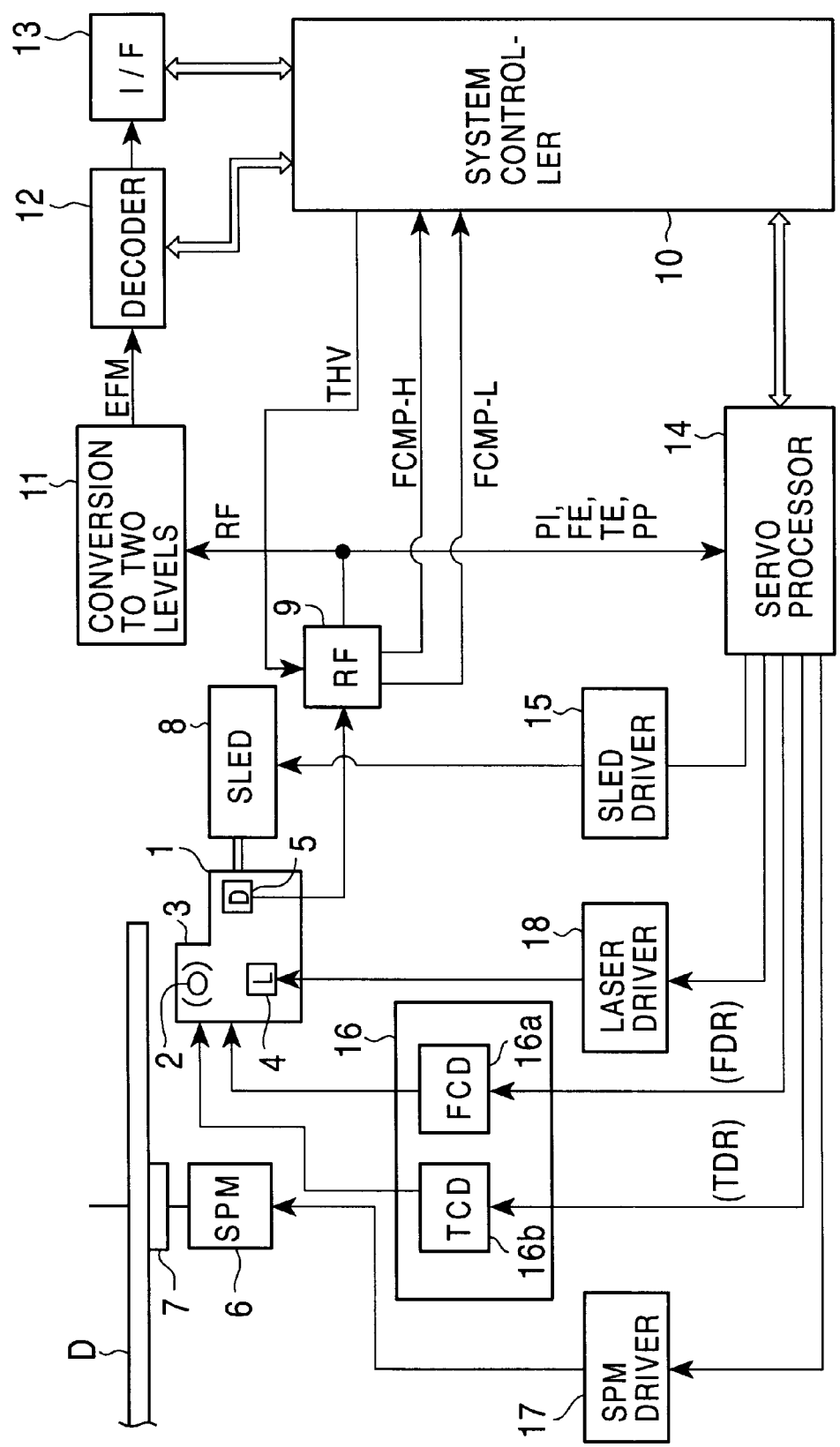
FIG. 4 is a block diagram illustrating an embodiment of a disk drive according to the present invention.

1. Construction of the disk drive according to the present embodiment
1.1 Construction of disk drive
1.2 Internal construction of RF amplifier
2. Focus jumping operation according to the present embodiment
2.1 Jumping-up operation in normal mode
2.2 Jumping-up operation in forcibly-closed loop mode
2.3 Jumping-up operation in increased brake signal mode
2.4 Jumping-down operation in normal mode
2.5 Jumping-down operation in forcibly-closed loop mode
2.6 Jumping-down operation in increased brake signal mode
3. Detailed description of focus jumping operation according to the present embodiment
3.1 First example of the focus jumping operation
3.2 Second example of the focus jumping operation
1. Construction of the disk drive according to the present embodiment
1.1 Construction of disk drive FIG. 4 is a block diagram illustrating the main part of a disk drive including a reproducing circuit and a servo control system according to the present embodiment of the invention. Although the present invention may also be applied to a disk drive capable of recording and reproducing data on and from various types of disk-shaped storage media, it is assumed herein that the disk drive is adapted to reproduce data from predetermined types of disks including a DVD-ROM.

In FIG. 4, a disk D is placed on a turn table 7 and rotated at a constant linear velocity (CLV) or a constant angular velocity (CAV) by a spindle motor 6 during a reproducing operation. The data recorded on the signal plane of the disk D is read by an optical pickup 1.

The optical pickup 1 includes a laser diode 4 serving as a light source for emitting a laser beam; an optical system including a deflecting beam splitter and an objective lens 2; and a photodetector 5 for detecting a laser beam reflected from the disk. The objective lens 2 is supported by a biaxial actuator 3 in such a manner that the objective lens 2 can move in both the tracking direction and the focusing direction.

During the reproducing operation of the disk drive, the laser beam reflected from the disk D is detected as a detection current by the photodetector 5. The photodetector 5 outputs the detection current as an information signal to an RF amplifier 9.

The RF amplifier 9 includes a current-voltage converter, an amplifying circuit, and a matrix operation circuit (RF matrix amplifier), and generates various signals required in the operation from the signal supplied from the photodetector 5. For example, the signals generated by the RF amplifier 9 include an RF signal or reproduced data, a push-pull signal PP used in the servo control operation, a focusing error signal FE, a tracking error signal TE, and a pull-in signal PI which is also called a sum signal.

Figure 5A:
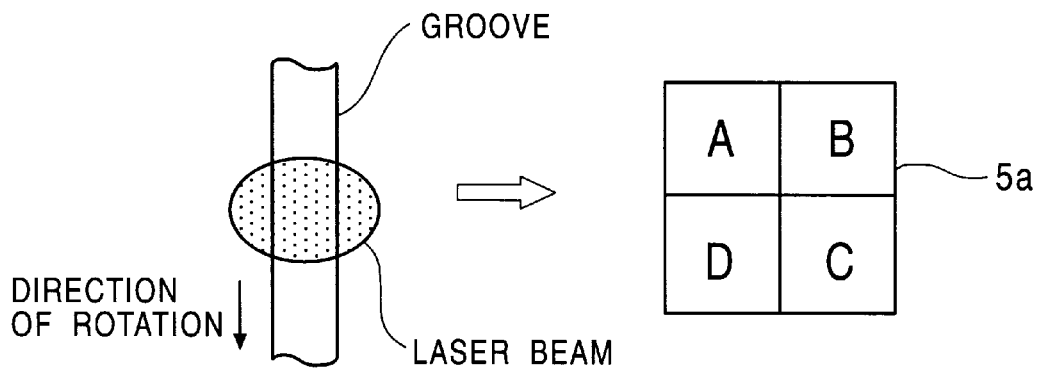
FIGS. 5A and 5B are schematic diagrams illustrating the detecting operation of a photodetector of an optical pickup.

The photodetector 5 includes a four-element detector 5A consisting of detector elements A, B, C, and D which are disposed at locations as shown in FIG. 5A. The focusing error signal FE is generated by performing an arithmetic operation (A+C)–(B+D) on the signals output from the detector elements A, B, C, and D. The pull-in signal PI is obtained by performing an arithmetic operation PI=(A+B+C+D).

Figure 5B:
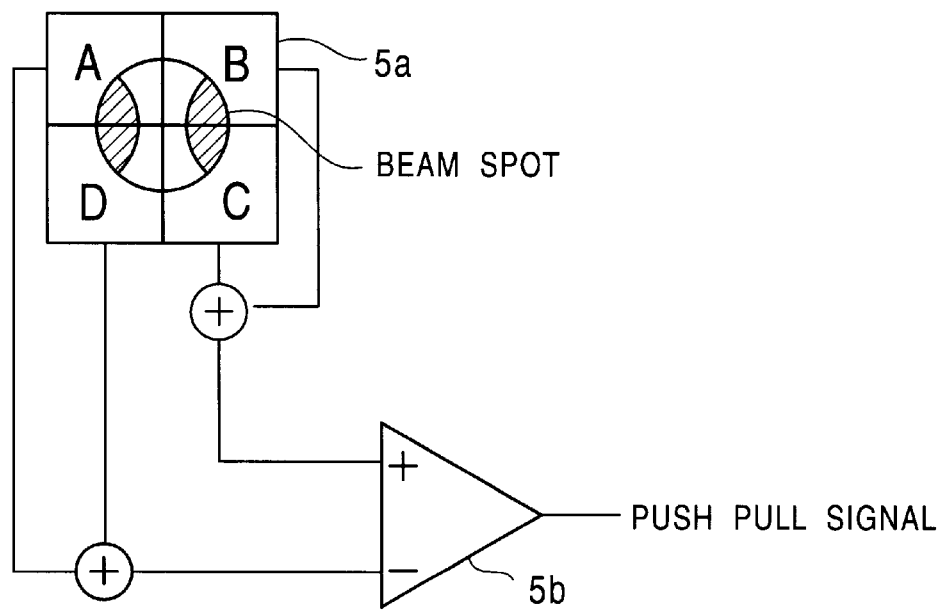

When the push-pull signal PP is generated by the four-element detector 5A, an arithmetic operation (A+D)–(B+C) is performed on the signals output from the detector elements A, B, C, and D of the detector 5A using a differential amplifier 5B as shown in FIG. 5B.

When a three-beam system is employed, the tracking error signal TE may also be generated by performing an arithmetic operation E–F on signals output from side-spot detectors E and F which are provided separately from the four-element detector shown in FIG. 5.

The signals generated by the RF amplifier 9 are supplied to a two-level conversion circuit 11 and a servo processor 14. More specifically, the reproduced RF signal is applied to the two-level conversion (binarization) circuit 11, and the push-pull signal PP, the focusing error signal FE, the tracking error signal TE, and the pull-in signal PI are supplied to the servo processor 14.

In the present embodiment, the RF amplifier 9 further includes two comparators for comparing the focusing error signal FE with predefined reference levels and generating detection signals FCMP-H and FCMP-L which are supplied to a system controller 10. The detection signals FCMP-H and FCMP-L are used by the system controller 10 to perform the focus jumping operation, as will be described in detail later.

The reproduced RF signal generated by the RF amplifier 7 is converted by the two-level conversion circuit 11 to a two-level signal, which is usually called EFM+signal (8–16 modulated signal), and supplied to a decoder 12. The decoder 12 performs EFM+demodulation on the received signal and also performs error correction thereby reproducing the information recorded on the disk D. The data decoded by the decoder 12 is supplied to a host computer or the like via an interface 13.

On the basis of the focusing error signal FE, the tracking error signal TE, and the push-pull signal PP supplied from the RF amplifier 9, the servo processor 14 generates various servo driving signals required in the focusing, tracking, sled, and spindle servo control operations. More specifically, a focus driving signal FDR and a tracking drive signal TDR are generated from the focusing error signal FE and the tracking error signal TE, and the generated signals are supplied to a biaxial driver 16.

The biaxial driver 16 includes for example a focusing coil driver 16A and a tracking coil driver 16B. The focusing coil driver 16A generates a driving current in accordance with the focus driving signal FDR and supplies the resultant driving current to the focusing coil of the biaxial actuator 3 thereby driving the objective lens 2 in a direction perpendicular to the disk surface. The tracking driver 16B generates a driving current in accordance with the tracking drive signal TDR, and supplies the resultant driving current to the tracking coil of the biaxial actuator 3 thereby driving the objective lens 2 in a radial direction along the surface of the disk. Thus a tracking servo loop and a focusing servo loop are formed with the optical pickup 1, the RF amplifier 9, the servo processor 14, and the biaxial driver 16.

When the focus jumping operation, which will be described later, is performed, the focusing servo loop is open and the servo processor 14 generates a kick signal serving as the focus driving signal FDR which is supplied to the focusing coil driver 16A to move the objective lens 2 and also generates a brake signal which is supplied to the focusing coil driver 16A to decelerate the motion of the objective lens 2.

The servo processor 14 also generates a spindle driving signal from the push-pull signal PP and supplies the resultant signal to the spindle motor driver 17. In response to the spindle driving signal, the spindle motor driver 17 supplies for example a three-phase driving signal to the spindle motor 6 so that the spindle motor 6 rotates at the CAV. Furthermore, the servo processor 14 generates a spindle driving signal in accordance with the spindle kick/brake signal supplied from the system controller 11, and supplies the resultant signal to the spindle motor driver 17 thereby starting or stopping the spindle motor 6.

The servo processor 14 generates a sled driving signal on the basis of a sled error signal produced from the low-frequency component of the tracking error signal TE and also on the basis of the accessing operation performed by the system controller 10, and supplies the resultant signal to the sled driver 15. In response to the sled driving signal, the sled driver 15 drives a sled mechanism 8. The sled mechanism 8 moves the whole optical pickup 1 in a radial direction along the surface of the disk. The sled mechanism 8 is driven by the sled motor which operates in response to the sled driving signal supplied by the sled driver 15.

The servo processor 14 also controls the light emitting operation of the laser diode 4 provided in the optical pickup 1. More specifically, in the reproducing operation, the servo processor 14 generates a laser driving signal under the control of the system controller 10, and supplies the generated laser driving signal to a laser driver 18, which in turn drives the laser diode 4 in accordance with the laser driving signal.

The servo control operation, decoding operation, and other various operations are controlled by the system controller 10 including a microcomputer and other elements.

For example, starting a reproducing operation, ending the reproducing operation, accessing to a track, and reproducing information in a fast forward or a fast reverse mode are accomplished by the system controller 10 by controlling the operation of the optical pickup 1 via the servo processor 14.

Furthermore, in the present embodiment, when the focus jumping operation which will be described in detail later is performed, the system controller 10 also outputs a threshold level control signal THV at a predetermined time thereby changing the threshold level of the comparator provided in the RF amplifier 9.

1.2 Internal construction of RF amplifier

Of the internal elements of the RF amplifier 9 shown in FIG. 4, those elements which serve to control the focus jumping operation according to the present embodiment are described below with reference to FIG. 6.

Figure 6:
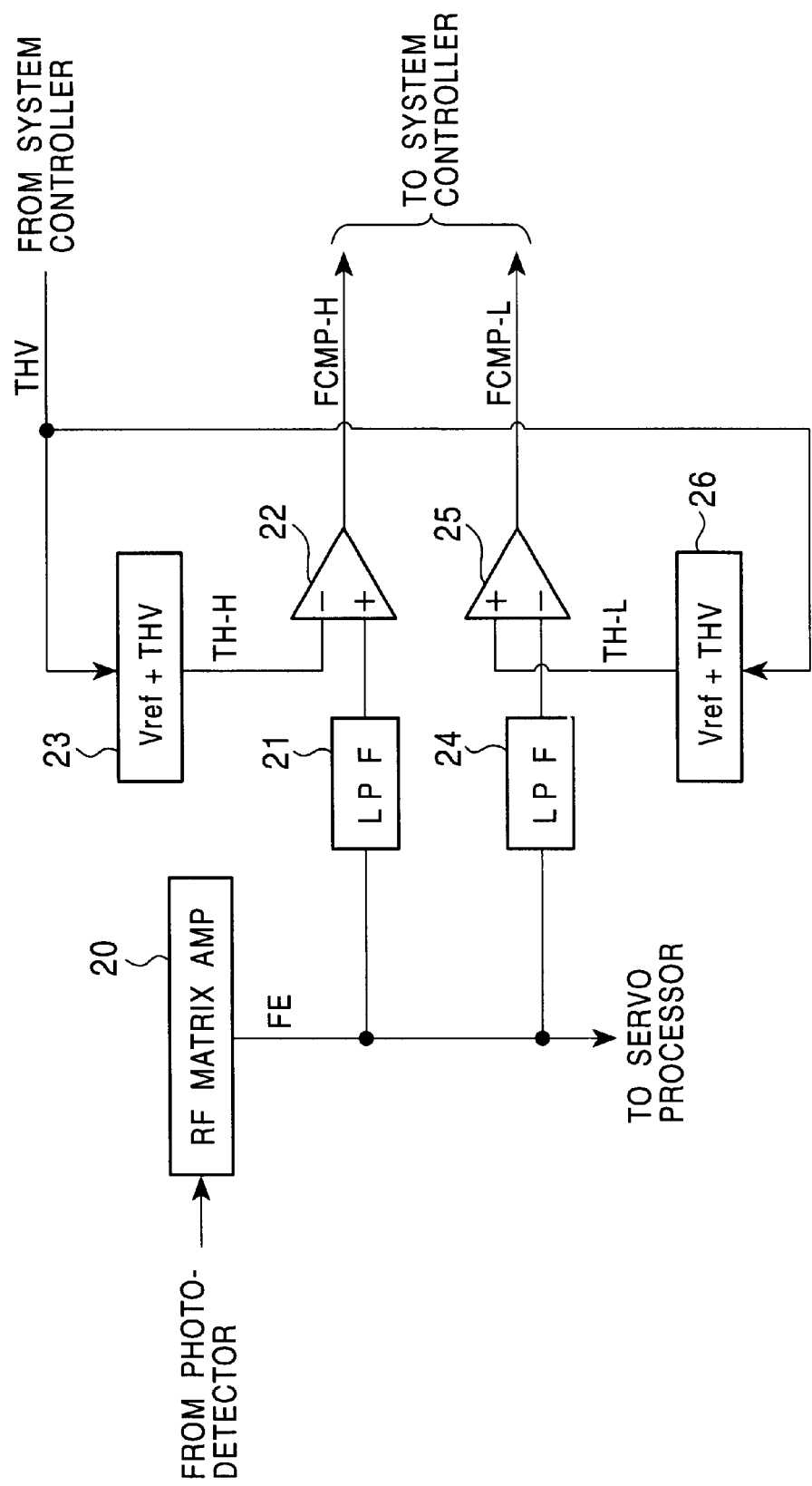
FIG. 6 is a block diagram illustrating the internal structure of an RF amplifier according to the embodiment of the invention.

On the basis of the information signal detected by the photodetector 5, as shown in FIG. 6, an RF matrix amplifier 20 generates the RF signal, the push-pull signal PP, the focusing error signal FE, the tracking error signal TE, and pull-in signal PI, and supplies these signals to various functional circuit elements.

The focusing error signal FE generated by the RF matrix amplifier 20 is supplied to the servo processor 14 as described earlier, and also to lowpass filters 21 and 24 as shown in FIG. 6. The lowpass filters 21 and 24 remove high-frequency components higher than predetermined frequencies.

Threshold level controllers (Vref+THV) 23 and 26 receive the threshold level control signal THV generated by the system controller 10. The threshold level controllers 23 and 26 produce threshold levels TH-H and TH-L, respectively, by adding the received threshold level control signal THV to predefined fixed reference levels Vref.

The threshold level TH-H is applied to the inverting input of a comparator 22. The servo error signal FE, whose bandwidth is limited by the lowpass filer 21, is applied to the noninverting input of the comparator 22. The comparator 22 compares the servo error signal FE having a value higher than zero with the threshold level TH-H. If the servo error signal FE is higher than the threshold level TH-H, then the comparator 22 outputs a high-level detection pulse signal FCMP-H.

The servo error signal FE whose bandwidth is limited by the lowpass filter 24 is applied to the inverting input of the comparator 25, and the threshold level TH-L is applied to the noninverting input of the comparator 25. The comparator 22 compares the absolute value of the servo error signal FE having a value lower than zero with the threshold level TH-L. If the absolute value of the servo error signal FE is greater than the threshold level TH-L, then the comparator outputs a high-level detection pulse signal FCMP-L.

The detection signals FCMP-H and FCMP-L are supplied to the system controller 10.

2. Focus jumping operation according to the present embodiment

2.1 Jumping-up operation in normal mode

In the present embodiment of the invention, the disk drive is constructed so that the focus jumping operation for a two-layer disk can be performed in a highly reliable manner regardless of conditions such as the position in which the computer is placed, the sensitivity variation of the biaxial driver, and the variation in the distance between two layers of the two-layer disk. Referring now to FIGS. 7–12, the focus jumping-up and jumping down operations are described below for various operation modes.

Figure 3A:
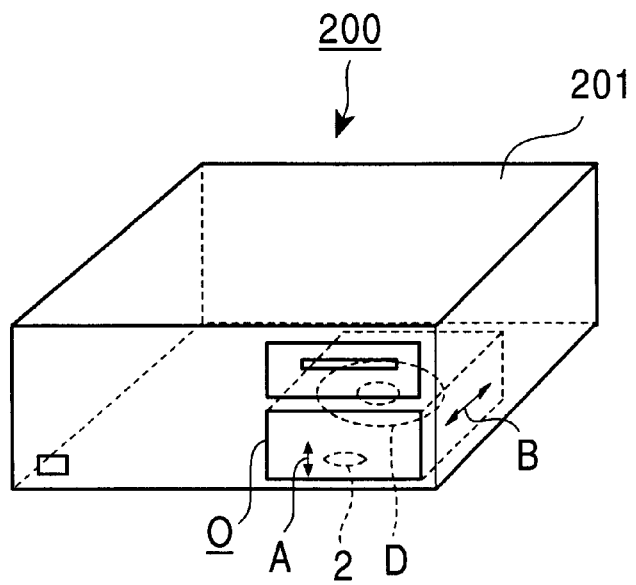
FIGS. 3A–3C are schematic diagrams in the form of a perspective view and a front view illustrating the positional relationship between a disk and the objective lens in the focusing direction for various installation positions in which a computer including a disk drive is placed.
Figure 3B:
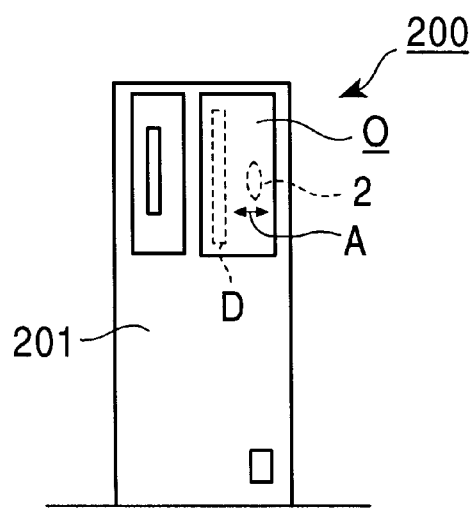
Figure 3C:
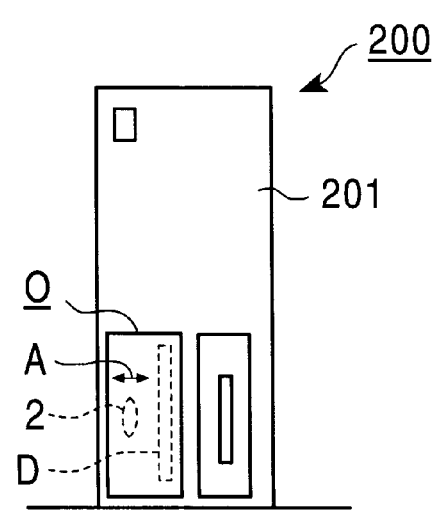

In the following description, it is assumed that the disk D is loaded in the disk drive of the present embodiment so that the relative position of the disk D with respect to the objective lens 2 is as shown in FIG. 3. That is, when the computer 200 and thus the disk drive O are placed in the horizontal position, the disk D is located such that its surface faces the table plane on which the computer 200 is placed, and the objective lens 2 is located below the disk D so that the focusing direction of the objective lens 2 is perpendicular to the table plane.

Figure 2:
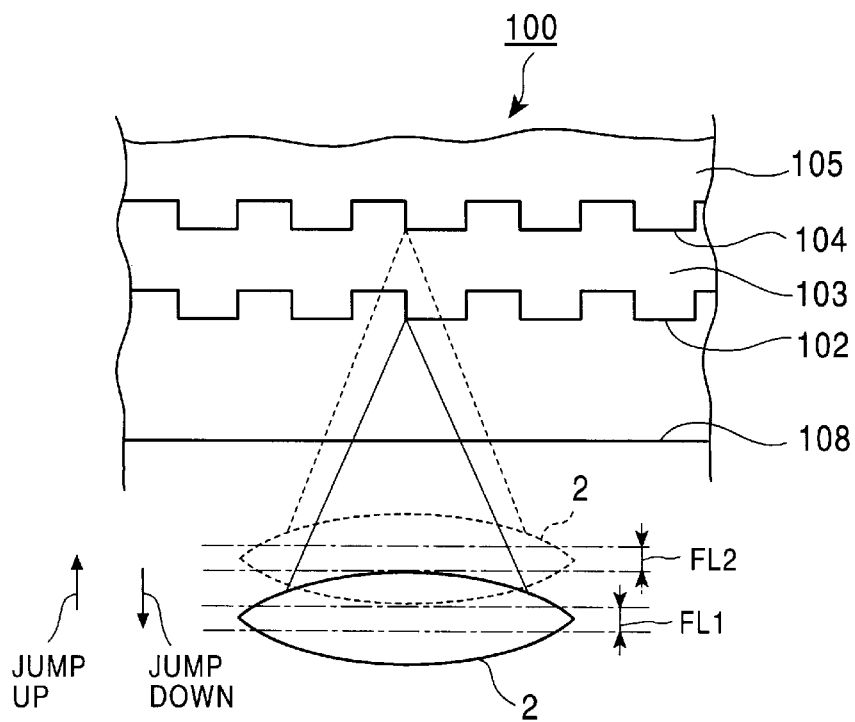
FIG. 2 is a schematic diagram illustrating just focusing positions of an objective lens for two signal layers of the two-layer disk.

Herein, "jumping up" refers to the operation in which the relative position of the objective lens 2 with reference to the two-layer disk is moved so that the focal point is jumped from the signal plane of the first layer to the signal plane of the second layer of the two-layer disk, as described earlier with reference to FIG. 2. Similarly, "jumping down" refers to the operation in which the focal point is jumped from the signal plane of the second layer to the signal plane of the first layer. In the following description, it is also assumed that the disk D is of the two-layer type.

FIGS. 7A–7D show the waveforms, that is, the variations in values with time, of the focusing error signal FE, the focus driving signal FDR, the detection signal FCMP-H generated by the comparator 22, and the detection signal FCMP-L generated by the comparator 25, respectively, which are obtained when the fucus jumping-up operation is performed in a correct manner. FIG. 7E shows the threshold level control signal THV which is output by the system controller 10 to change the threshold levels (TH-H, TH-L) of the comparators 22 and 25.

Figure 7:
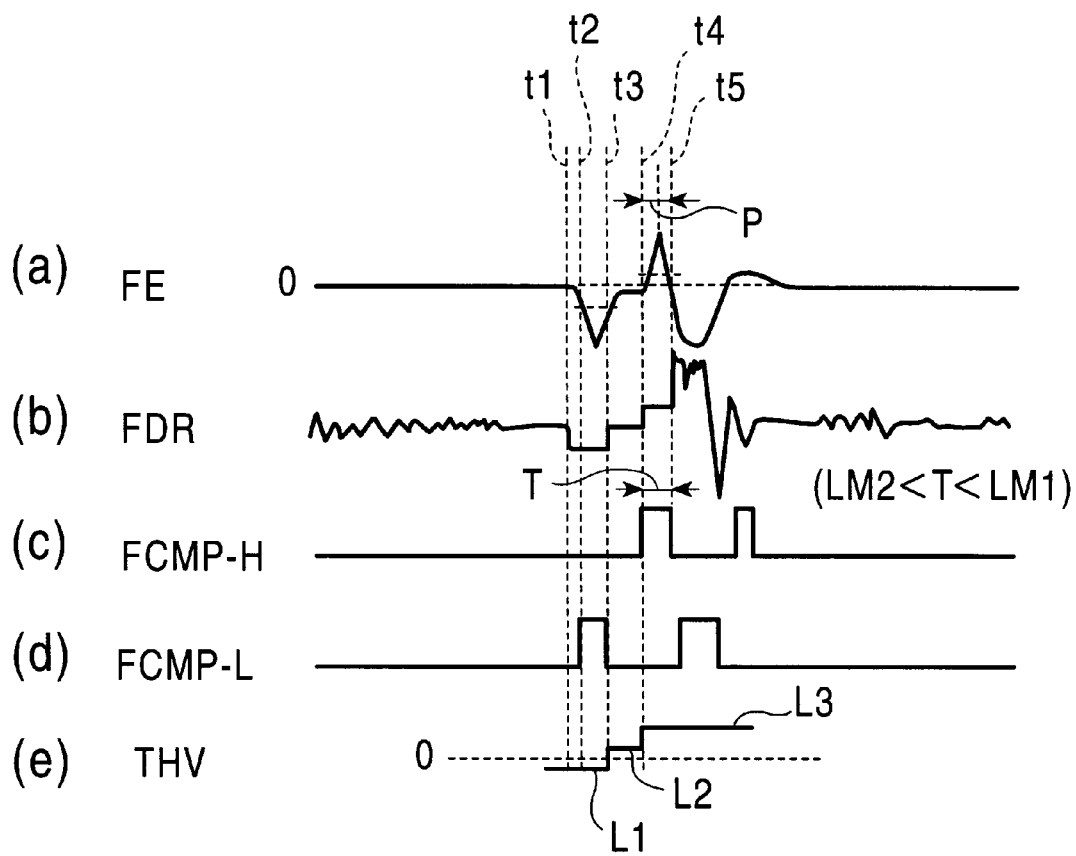
FIG. 7 is a timing chart illustrating an jumping-up operation in a normal mode in a focus jumping operation.

Until time t1 in FIG. 7, the focal point of the objective lens 2 is maintained on the first layer of the disk D by means of the servo control operation performed through the focusing servo loop. At time t1, the system controller 10 opens the servo loop which has been in the closed state until time t1, and outputs the focus driving signal FDR as the kick signal as shown in FIG. 7B. The kick signal has a value which has been determined in advance so that the kick signal has a polarity corresponding to the direction in which the focal point of the objective lens 2 is moved from the first layer to the second layer and so that the voltage of the kick signal is large enough to apply a large enough acceleration to the objective lens 2 to shift the focal point from the first layer to the second layer.

In response to the kick signal, the objective lens 2 is forced to move in a direction from the first layer toward the second layer. As a result, the focusing error signal FE has a negative value as shown in FIG. 7A after zero-crossing occurs at time t1. That is, the negative-value waveform of the focusing error signal FE appears when the objective lens 2 moves from the position at which the focal point is on the first layer toward the position at which the focal position is on the second layer. In the present invention, the term "zero-crossing" is used to describe not only the zero-crossing transition (at time t5) of the focusing error signal FE, but also a transition of the focusing error signal FE arising from a substantially zero level to a positive or negative level or a transition of the focusing error signal FE falling from a positive or negative level to a zero level.

The comparator 25, which serves to detect an occurrence of a focusing error signal FE having a negative value, has a threshold value relatively close to the zero level. Thus the comparator 25 detect the negative waveform of the focusing error signal FE which appears at time t1, and outputs a detection signal FCMP-L having a high level during a period of time from t2 to t3 as shown in FIG. 7D.

When the detection signal FCMP-L falls down from the high level, the focal point of objective lens 2 has gone out of the first layer and is moving toward the second layer. When the system controller 10 detects, at time t3, the high-to-low transition of the detection signal FCMP-L, the system controller 10 turns off the kick signal from the servo processor 14. As a result, after time t3, the objective lens 2 moves toward the second layer by means of inertia given by the kick signal which was being output until time t3. The focusing error signal FE is substantially equal to zero during the period from t3 to t4 because the focal point of the objective lens 2 is within an intermediate region between the first and second layers.

After time t3, the focal point of the objective lens 2 further approaches the second layer, and the focusing error signal FE has a positive value first at time t4 as shown in FIG. 7A, that is, zero-crossing occurs at time t4.

When the comparator 22 detects the occurrence of the positive waveform of the focusing error signal FE, the comparator 22 outputs a high-level detection pulse signal FCMP-H at time t4 as shown in FIG. 7C.

At time t4, in response to the low-to-high transition of the detection signal FCMP-H, the system controller 10 outputs a brake signal having a value equal to a predefined level as shown in FIG. 7B. The brake signal has a polarity opposite to that of the kick signal so that the objective lens 2 is driven by the brake signal in a direction opposite to that in which the objective lens 2 was driven by the kick signal. That is, the objective lens 2 moving at a certain velocity toward the disk surface is decelerated by the brake signal after time t4.

After time t4, the objective lens 2 further moves toward the disk surface with the speed being decreased by the brake signal, the objective lens 2 approaches the just focusing point associated with the second layer.

The positive waveform of the focusing error signal FE which appeared at time t4 crosses the zero level (where the objective lens 2 focuses the light beam just on the signal plane of the second layer). After that, the focusing error signal FE has a negative waveform. In other words, the focusing error signal varies in an S-shaped fashion. At time t5 at which the focusing error signal FE crosses the zero level, the detection signal FCMP-H at the high level falls down.

If the period of time T from t4 to t5 during which the detection signal FCMP-H is at the high level is shorter than a predetermined period of time LM1 and longer than a predetermined period of time LM2 (LM2<T<ML1), then the operation is performed in a normal mode as described below.

If T meets LM2<T<LM1, then the objective lens 2 is located, at time t5, within the second focus-drawing-in range FL2 associated with the second layer (refer to FIG. 2), and the velocity of the objective lens 2 has become low enough by time t5 to draw the objective lens to the just focusing position. In the normal mode, the system controller 10 turns off, at time t5, the brake signal which has been being applied to the focusing coil driver 16A during the period of time from time t4, and closes the servo loop which has been in the open state. After time t5, focusing servo control operation is performed in accordance with the focusing error signal FE shown in FIG. 7A so that the objective lens 2 comes to the just focusing point associated with the second layer.

The threshold levels of the comparators 22 and 25 are set to values TH-H and TH-L (Vref+THV), respectively, close to the zero level so that the positive and negative waveforms of the focusing error signal FE can be detected. More specifically, at times shown in FIG. 7E, the threshold levels TH-H and TH-L are varied in a stepwise fashion by the threshold level control circuits 23 and 26 using the threshold level control signal THV varying in a stepwise fashion. That is, the threshold levels TH-H and TH-L are set to different values by the threshold level control signal THV having a level L1 during the period of time form t1 to t3, a level L2 during the period of time from t3 to t4, and a level L3 during the period after time t4.

As described earlier, the threshold level control signal THV shown in FIG. 7E are generated by the system controller 10 and added to the reference level (voltage) Vref.

The high-to-low transition of the detection signal FCMP-L at time t3 is detected when the negative waveform of the focusing error signal FE comes to have a value which is not very close to the zero level so that the kick signal is turned off at time t3 sufficiently early to prevent the objective lens 2 from being accelerated to a greater extent than necessary. On the other hand, the low-to-high transition of the detection signal FCMP-H at time t4 is detected when the positive waveform of the focusing error signal FE comes to have a value relatively apart from the zero level, and thus the brake signal is output without having a significant delay. Furthermore, the high-to-low transition of the detection signal FCMP-H at time t5 is detected when the positive waveform of the focusing error signal FE comes to have a value relatively apart from the zero level so that the focusing servo loop is closed at sufficiently early time. The control of the threshold levels TH-H and TH-L of the respective comparators 22 and 25 which are changed as described above, in conjunction with the control of the operation mode which will be described later, makes it possible to perform the focus jumping operation in a reliable fashion.

2.2 Jumping-up operation in forcibly-closed loop mode

FIGS. 8A–8D show the waveforms of the focusing error signal FE, the focus driving signal FDR, the detection signal FCMP-H generated by the comparator 22, and the detection signal FCMP-L generated by the comparator 25, respectively, which are obtained when the fucus jumping-up operation is performed in a forcibly-closed loop mode.

Figure 8:
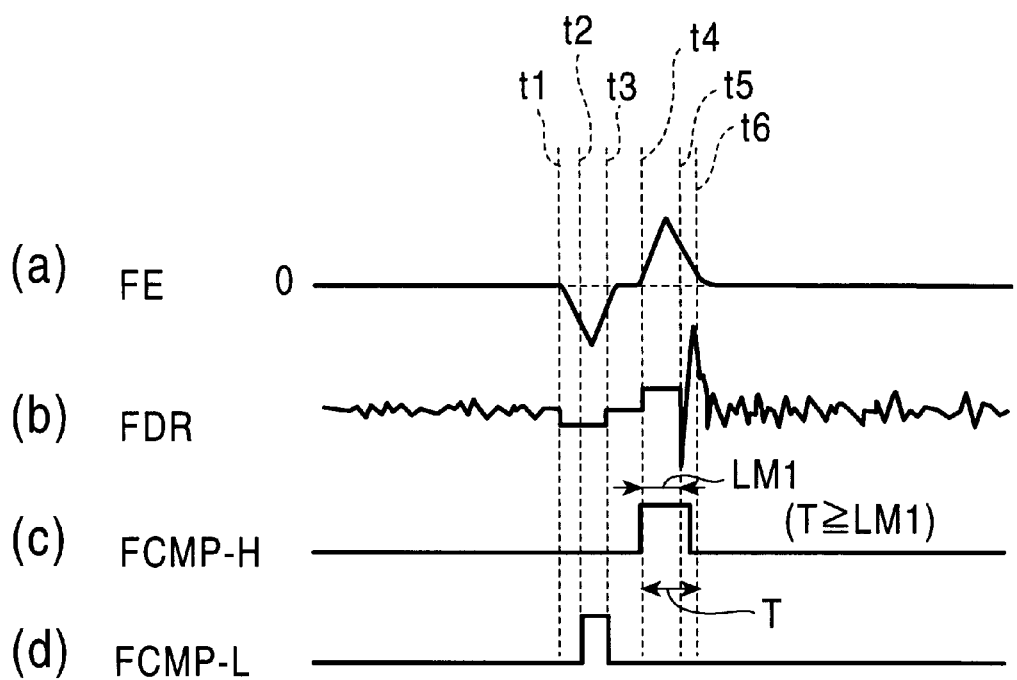
FIG. 8 is a timing chart illustrating a jumping-up operation in a forcibly-closed loop mode in the focus jumping operation.

Although not shown in FIG. 8, the threshold level control signal THV has various values at various times similar to those shown in FIG. 7. Furthermore, the operation until time t4 is performed in a similar manner to that described above and thus the operation until time t4 is not described in further detail herein.

In the example shown in FIG. 8, the detection signal FCMP-H obtained by detecting the positive waveform of the focusing error signal has a high level during a period of time T (from t4 to t6) longer than the predetermined value LM1 (T>LM1). This can occur if the velocity of the objective lens 2 moving in a jumping-up direction is lower than a proper value at time t5, because for example the acceleration applied by the kick signal to the objective lens 2 during the period of time from t1 to t3 is too small.

In this case, if the normal mode is employed, then the focusing loop is closed at time t6 at which the detection signal FCMP-H falls down. However, the timing of closing the focusing loop is probably too late because there is a high possibility that in response to the brake signal the objective lens 2 has come back by time t6 to the first layer from the second focus-drawing-in range FL2 associated with the second layer, and thus there is a high possibility that the focus drawing-in operation fails. To prevent the above problem, the operation is performed in the forcibly-closed loop mode when the period of time T exceeds LM1 (T≧LM1).

In the forcibly-closed loop mode, if a predetermined time LM1 has elapsed from time t4 at which the detection signal FCMP-H rose up to a high level, the system controller 10 turns off the brake signal and closes the focusing servo loop, as shown in FIG. 8B, immediately when the elapse of predetermined time LM1 from time t4 is detected at time t5 without waiting for the high-to-low transition of the detection signal FCMP-H.

Because the objective lens 2 is within the focus-drawing-in range FL2 at time t5, if the focusing servo loop is closed at time t5, then the focus drawing-in operation is performed successfully.

2.3 Jumping-up operation in the increased brake signal mode

FIGS. 9A–9D illustrate the waveforms of the focusing error signal FE, the focus driving signal FDR, the detection signal FCMP-H generated by the comparator 22, and the detection signal FCMP-L generated by the comparator 25, respectively, which are obtained when the focus jumping-up operation is performed in the increased brake signal mode. Also in this case, the threshold level control signal THV varies with time in a similar manner to that shown in FIG. 7, although not shown in FIG. 9. Furthermore, the operation until time t4 is performed in a similar manner to that described above with reference to FIGS. 7 and 8, and thus the operation until time t4 is not described herein.

Figure 9:
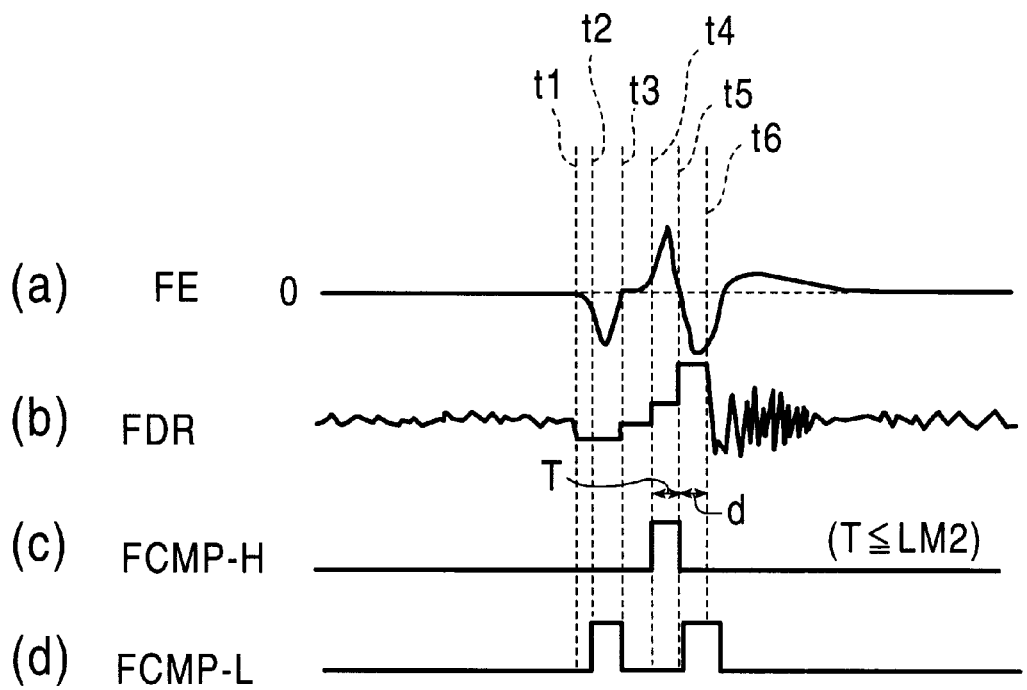
FIG. 9 is a timing chart illustrating a jumping-up operation in an increased brake signal mode in the focus jumping operation.

In the example shown in FIG. 9, the detection signal FCMP-H has a high level during a period of time T from t4 to t6 which is shorter than the predetermined value LM2 (T≦LM2). This can occur if the velocity of the objective lens 2 is not decelerated to a low enough value after the brake signal was applied at time t4, and the objective lens 2 comes to the just focusing point associated with the second layer at a rather early time.

In such a situation, if the brake signal is turned off and the focusing servo loop is closed at time t5 as in the normal operation mode, then the objective lens 2 exceeds the second focus-drawing-in range FL2 associated with the second layer and further moves in the jumping-up direction, and thus there is a high possibility that the focus drawing-in operation within the second focus-drawing-in range FL2 fails. To prevent the above problem, the operation is performed in the increased brake signal mode when the period of time T is shorter than the predetermined value LM2 (T≦LM2).

At time t5, although the focal point of the objective lens 2 is within the second focus-drawing-in range FL2 associated with the second layer, the velocity of the objective lens 2 is higher than the proper value. In other words, the objective lens 2 is not decelerated to a value low enough to converge the location of the objective lens 2 to a correct location after closing the servo loop. Thus in the increased brake signal mode, as shown in FIG. 9B, the system controller closes the focusing servo loop at time t5, and further applies the brake signal having a predetermined value even after time t5 over the time period d from t5 to t6. More specifically, the additional brake signal applied during the time period from t5 to t6 has a level higher by a predetermined amount than that of the brake signal applied during the previous time period from t4 to t5.

Thus, at time t5, the objective lens 2 is further decelerated by the brake signal having the increased level, and thus the location of the objective lens 2 is converged to the just focusing point associated with the second layer after the focusing servo loop is closed. After the additional brake signal is turned off at time t6, the focusing servo operation is performed in a normal manner through the closed focusing servo loop in response to the focusing error signal FE.

In the disk drive, if the initial parameters of the focus jumping operation are set so that the jumping-up operation is performed in the normal mode (refer to FIG. 7) when the computer 200 including the disk drive is placed in the horizontal position as shown in FIG. 3A, then there is a high possibility that acceleration greater than necessary is applied to the objective lens 2 in the jumping-up operation when the computer 200 is placed in the vertical position as shown in FIG. 3A or 3B. However, in the present embodiment, when the computer is placed in such a position, the jumping-up operation may be automatically performed in the increased brake signal mode as shown in FIG. 9 thereby ensuring that the focus jumping operation is performed successfully.

Conversely, if the parameters are set so that the jumping-up operation is performed in the normal mode when the computer 200 is placed in the vertical position as shown in FIG. 3A or 3B, there is a high possibility that the acceleration applied to the objective lens 2 in the jumping-up operation is not enough. However, in the present embodiment, the jumping-up operation is automatically performed in the forcibly-closed loop mode as described above with reference to FIG. 8 thereby ensuring that the focus jumping operation is performed successfully.

2.4 Jumping-down operation in the normal mode

FIGS. 10A–10D show the waveforms, that is, the variations in values with time, of the focusing error signal FE, the focus driving signal FDR, the detection signal FCMP-H generated by the comparator 22, and the detection signal FCMP-L generated by the comparator 25, respectively, which are obtained when the jumping-down operation is performed in the normal mode.

FIG. 10E shows the threshold level control signal THV which is output by the system controller 10 to change the threshold levels (TH-H, TH-L) of the comparators 22 and 25.

In the jumping-down operation, the focal point of the objective lens 2 is moved from the second layer to the first layer. As a result, in the jumping-down operation, the focusing error signal FE has a waveform having a polarity opposite to that in the jumping-up operation. Therefore, the jumping-down operation is different from the jumping-up operation in that the focusing error signal FE (having a positive waveform) which appears when the focal point passes through the second layer is detected as a detection signal FCMP-H by the comparator 22, and in that the focusing error signal FE (having a negative waveform) which appears when the focal point is near the second layer is detected as a detection signal FCMP-L by the comparator 25.

Correspondingly, as shown in FIG. 10E, the threshold level control signal THV in the jumping-down operation has a polarity opposite to that in the jumping-up operation. However, the possible levels L1, L2, and L3 the threshold level control signal THV can take are set to values which are optimized for the jumping-down operation and whose absolute values may be different from those employed in the jumping-up operation. The threshold value control signal THV is varied in a stepwise fashion as in a similar fashion to the jumping-up operation, although it is not described in further detail herein.

Figure 10:
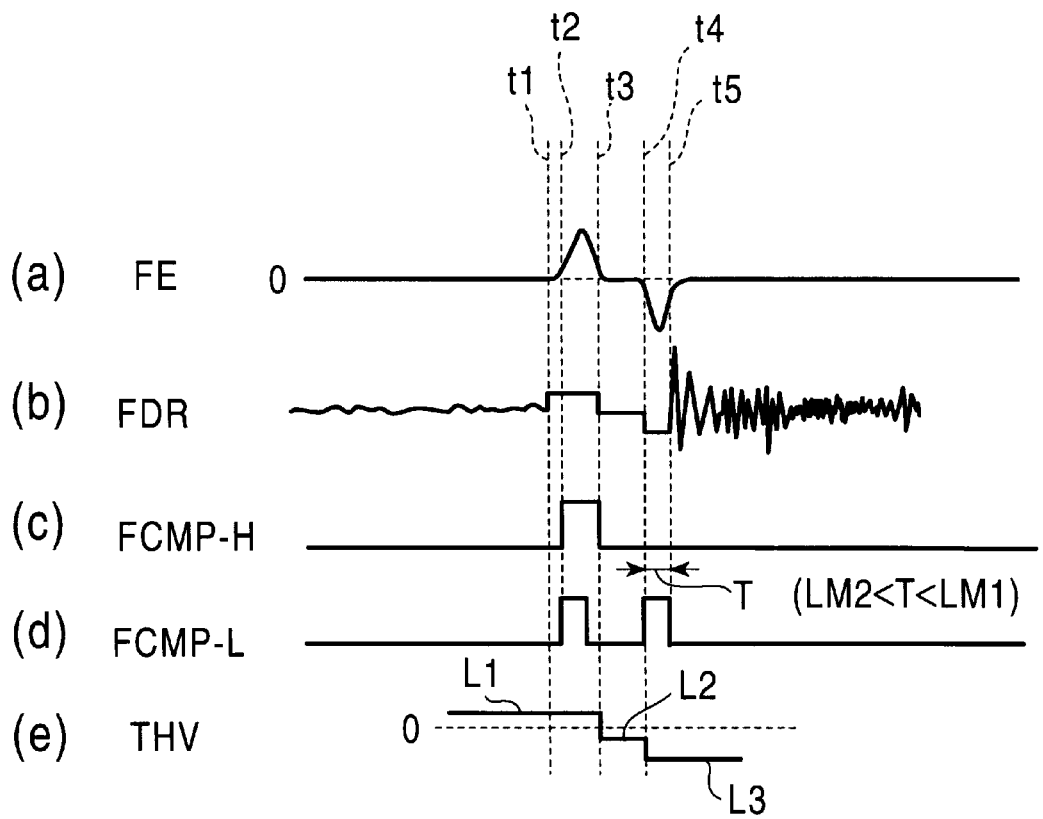
FIG. 10 is a timing chart illustrating a jumping-down operation in a normal mode in the focus jumping operation.

Until time t1 in FIG. 10, the focal point of the objective lens 2 is maintained on the second layer of the disk D by means of the servo control operation performed through the focusing servo loop. At time t1, the system controller 10 opens the servo loop which has been in the closed state until time t1, and outputs the focus driving signal FDR serving as the kick signal as shown in FIG. 10B. The kick signal has a value which has been determined in advance so that the kick signal has a polarity (opposite to that employed in the jumping-up operation) corresponding to the direction (jumping-down direction) in which the focal point of the objective lens 2 is moved from the second layer to the first layer and so that the voltage of the kick signal is large enough to apply a large enough acceleration to the objective lens 2 to shift the focal point from the second layer to the first layer.

In response to the kick signal, the objective lens 2 is forced to move in the jumping-down direction from the second layer on which the focal point was located. As a result, a positive waveform of the focusing error signal FE appears at time t1 as shown in FIG. 10A, wherein the positive polarity indicates that the focal point of the objective lens 2 is moving from the second layer in the jumping-down direction. In response to the waveform of the focusing error signal FE, the comparator 22 outputs a high-level detection signal FCMP-H during a time period from t2 to t3 as shown in FIG. 10D.

When the detection signal FCMP-H falls down from the high level at time t3, the focal point of objective lens 2 has gone out of the second layer and is moving toward the second layer. When the high-to-low transition of the detection signal FCMP-H occurs at time t3, the system controller 10 turns off the kick signal from the servo processor 14. As a result, after time t3, the objective lens 2 moves toward the first layer by means of inertia given by the kick signal which was being output until time t3.

When the focal point of the objective lens 2 has come to a location close to the first layer as a result of the movement in the jumping-down direction, a negative waveform appears in the focusing error signal FE at time t4 in such a manner that the negative waveform rises at time t4 from the zero level as shown in FIG. 10A. When the comparator 25 detects the occurrence of the negative waveform of the focusing error signal FE, the comparator 25 outputs a high-level detection pulse signal FCMP-L for a time period from t4 to t5 as shown in FIG. 10D.

At time t4, in response to the low-to-high transition of the detection signal FCMP-L, the system controller 10 outputs a brake signal having a value equal to a predefined level as shown in FIG. 10B. The objective lens 2 moving at a certain velocity in the jumping-down direction is decelerated by the brake signal after time t4.

After time t4, the objective lens 2 further moves in the jumping-down direction with the speed being decreased by the brake signal, the objective lens 2 approaches the just focusing point associated with the first layer.

When the positive waveform of the focusing error signal FE which appeared at time t4 crosses the zero level (becomes substantially equal to zero where the objective lens focuses the light beam on the first layer) at time t5, the detection signal FCMP-L which has been at the high level falls down.

When the period of time T from t4 to t5 during which the detection signal FCMP-L is at the high level is shorter than a predetermined period of time LM1 and longer than a predetermined period of time LM2 (LM2<T<ML1), then the operation is performed in a normal mode as described below. The time periods T, LM1, and LM2 are set to proper values corresponding to the conditions of the jumping-down operation, and these may be different from the values employed in the jumping-up operation so that the focus jumping-down operation is performed correctly.

If the time period T meets LM2<T<LM1, then the objective lens 2 is located, at time t5, within the first focus-drawing-in range FL1 associated with the first layer (refer to FIG. 2), and the velocity of the objective lens 2 has become low enough by time t5. Thus, in the normal mode, at time t5, the system controller 10 turns off the brake signal and closes the servo loop which has been in the open state. After time t5, focusing servo control operation is performed in accordance with the focusing error signal FE shown in FIG. 10A so that the objective lens 2 comes to the just focusing point associated with the first layer.

2.5 Jumping-down operation in the forcibly-closed loop mode

FIGS. 11A–11D show the waveforms of a focusing error signal FE, the focus driving signal FDR, the detection signal FCMP-H generated by the comparator 22, and the detection signal FCMP-L generated by the comparator 25, respectively, which are obtained when the fucus jumping-down operation is performed in a forcibly-closed loop mode.

Figure 11:
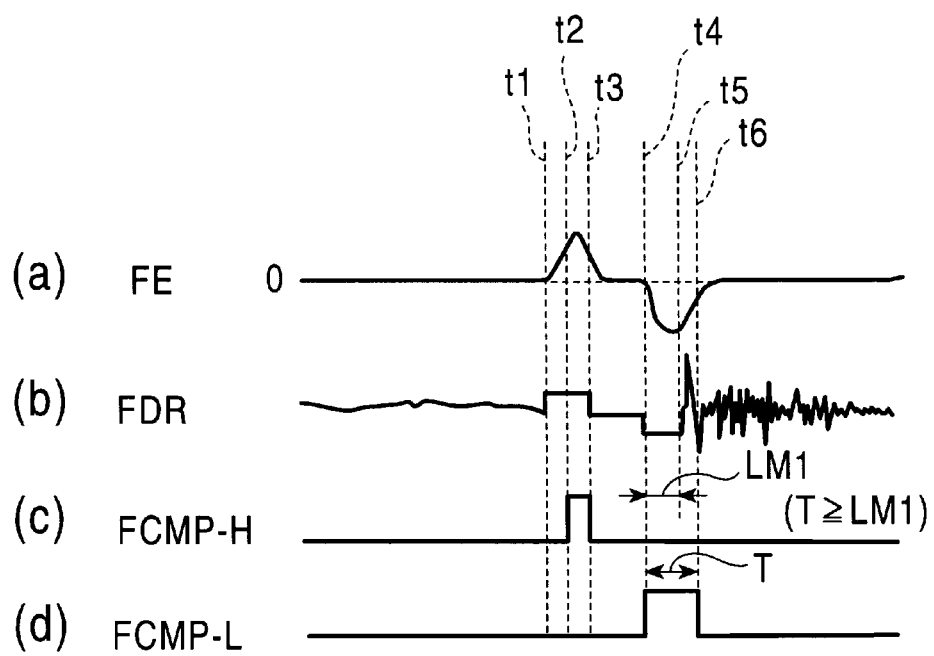
FIG. 11 is a timing chart illustrating a jumping-down operation in a forcibly-closed loop mode in the focus jumping operation.

Although not shown in FIG. 11, the threshold level control signal THV varies with time in a similar manner to that shown in FIG. 7. Furthermore, the operation until time t4 is performed in a similar manner to that described above with reference to FIG. 10, and thus the operation until time t4 is not described herein.

In the example shown in FIG. 11, the detection signal FCMP-L obtained by detecting the positive waveform of the focusing error signal which appeared at time t4 has a high level during a period of time T (from t3 to t4) longer than the predetermined value LM1 (T>LM1). This can occur if the velocity of the objective lens 2, which is moving in the jumping-down direction and approaching the just focusing point associated with the first layer, is lower than a proper value, because the acceleration applied by the kick signal to the objective lens 2 during the period of time from t1 to t3 is too small.

In this case, if the normal mode is employed, then the focusing loop is closed at time t6 at which the detection signal FCMP-L falls down. However, the timing of closing the focusing loop is probably too late because there is a high possibility that in response to the brake signal the objective lens 2 has come back to the second layer at time t6 from the first focus-drawing-in range FL1 associated with the first layer, and thus there is a high possibility that the focus jumping-down operation fails. To prevent the above problem, the operation is performed in the forcibly-closed loop mode when the period of time T exceeds LM1 (T≧LM1).

In the forcibly-closed loop mode, if a predetermined time LM1 has elapsed from time t4 at which the detection signal FCMP-L rose up to a high level, the system controller 10 turns off the brake signal and closes the focusing servo loop, as shown in FIG. 11B, immediately when the elapse of predetermined time LM1 from time t4 is detected at time t5 without waiting for the high-to-low transition of the detection signal FCMP-L.

Because the objective lens 2 is located within the focus-drawing-in range FL1 at time t5, if the focusing servo loop is closed at time t5 as described above, then the focus jumping-down operation is performed successfully.

2.6 Jumping-down operation in the increased brake signal mode

FIGS. 12A–12D illustrate the waveforms of the focusing error signal FE, the focus driving signal FDR, the detection signal FCMP-H generated by the comparator 22, and the detection signal FCMP-L generated by the comparator 25, respectively, which are obtained when the focus jumping-down operation is performed in the increased brake signal mode. Also in this case, the threshold level control signal THV varies with time in a similar manner to that shown in FIG. 10, although not shown in FIG. 12. Furthermore, the operation until time t4 is performed in a similar manner to that described above with reference to FIGS. 10 and 11, and thus the operation until time t4 is not described herein.

Figure 12:
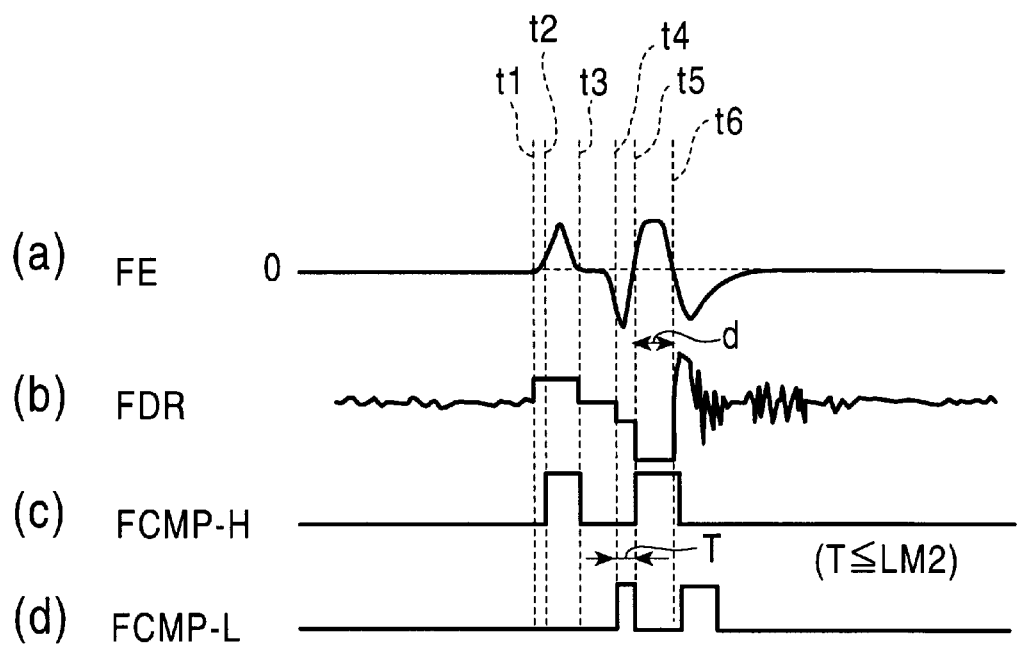
FIG. 12 is a timing chart illustrating a jumping-down operation in an increased brake signal mode in the focus jumping operation.

In the example shown in FIG. 12, the detection signal FCMP-L has a high level during a period of time T from t4 to t5 which is shorter than the predetermined value LM2 (T≦LM2). This can occur if the velocity of the objective lens 2 has not been decelerated to a low enough value by time t5 after the brake signal was applied at time t4, that is, the velocity of the objective lens 2 is greater than a proper velocity at time t5, and the objective lens 2 comes to the just focusing point associated with the first layer at a rather early time.

In such a situation, if the brake signal is turned off and the focusing servo loop is closed at time t5 as in the normal operation mode, then the objective lens 2 exceeds the first focus-drawing-in range FL1 associated with the first layer and further moves in the jumping-down direction, and thus there is a high possibility that the operation of drawing the objective lens to the just focus point associated with the first layer fails. To prevent the above problem, the operation is performed in the increased brake signal mode when the period of time T is shorter than the predetermined value LM2 (T≦LM2).

Although the objective lens 2 is within the first focus-drawing-in range FL1 associated with the first layer at time t5, the velocity of the objective lens 2 is not decelerated to a value low enough to converge the location of the objective lens 2 to the just focusing point after closing the servo loop. Thus in the increased brake signal mod, as shown in FIG. 12B, the system controller closes the focusing servo loop at time t5, and further applies the brake signal having a predetermined value even after time t5 over the time period d from t5 to t6. More specifically, the additional brake signal applied during the time period from t5 to t6 has an absolute value greater by a predetermined amount than that of the brake signal applied during the previous time period from t4 to t5. The time period d, during which the additional brake signal is applied, may be set to a value different from the that employed in the jumping-up operation so that the focus jumping-down operation is performed correctly.

Thus, at time t5, the objective lens 2 is further decelerated by the brake signal having the increased level, and the location of the objective lens 2 is converged to the just focusing location associated with the first layer after the focusing servo loop is closed. After the additional brake signal is turned off at time t6, the focusing servo operation is performed in the normal manner through the closed focusing servo loop in response to the focusing error signal FE.

Also in the jumping-down operation, as described above, the operation is performed in a proper mode selected from the normal mode, the forcibly-closed loop mode, or the increased brake signal mode depending on the velocity of the objective lens 2 thereby ensuring, as in the jumping-up operation, that the focus jumping-down operation always becomes successful regardless of the position in which the disk drive is placed.

3. Detailed description of focus jumping operation according to the present embodiment 3.1 First example of the focus jumping operation The detailed processing steps of performing the focus jumping operation are described below with reference to a first example in conjunction with the flow charts shown in FIGS. 13 and 14. The process is performed under the control of the system controller. 10 as described below.

Figure 13:
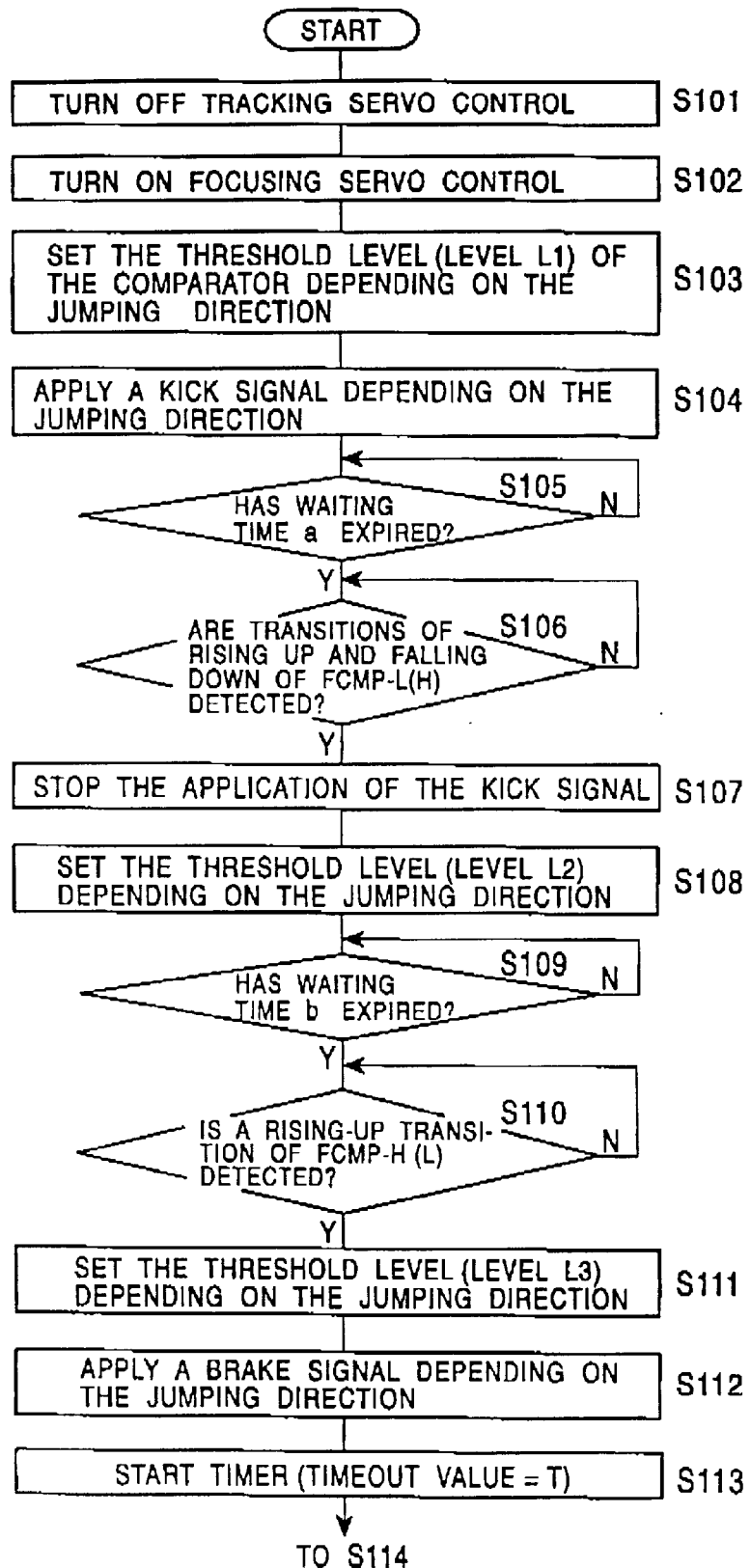
FIG. 13 is a flow chart illustrating a first example of processing steps of the focus jumping operation according to an embodiment of the invention.

When the focus jumping operation is performed under the control of the system controller, first in step S101 in FIG. 13 the servo processor 14 turns off the tracking servo operation (opens the servo loop). Then in step S102, the focusing servo operation is turned off (the servo loop is opened).

In the following step S103, the threshold level control signal THV is set to a level L1 (refer to FIG. 7 or 10) and the resultant threshold level control signal THV is output thereby setting the threshold levels TH-H and TH-L of the comparators 22 and 25 to proper values depending on the jumping direction (jumping-up direction or jumping-down direction). Then the process goes to step S104.

In step S104, the kick signal serving as the focus driving signal depending on the jumping direction is applied to the focusing coil driver 16A. In the following step S105, the process waits for a waiting time having a predetermined length of time a. Then the process goes to step S106.

In step S106, the process waits until a low-to-high transition and a high-to-low transition are detected in the detection signal FCMP-L during the jumping-up operation or in the detection signal FCMP-H during the jumping-down operation. That is, it is determined whether the detection signal FCMP-L(H) having a high level during a time period from t2 to t3 as shown in FIGS. 7–12 is detected.

The reason why the process waits for the predetermined time at step S105 before performing the detecting process at step S106 after the application of the kick signal is to prevent a spurious detection signal FCMP-L(H) having a high level which may appear immediately after the application of the kick signal from being mistaken for a correct detection signal FCMP-L(H) in step S106 thereby improving the reliability of the focus jumping operation.

If a positive conclusion is obtained in step S106, that is, if a high-to-low transition of the detection signal FCMP-L (H) is detected at time t3, then the process goes to step S107 and the system controller 10 turns off the kick signal applied from the servo processor 14 to the focusing coil driver 16a. Then in step S108, the threshold levels TH-H and TH-L of the comparators 22 and 25 are changed to proper values depending on the jumping direction by setting the threshold level control signal THV to a level L2 and supplying the resultant threshold level control signal to the comparators 22 and 25. Then the process goes to step S109.

In step S109, the process waits for a waiting time having a predetermined length of time b, and then goes to step S110. In step S106, the process waits until a low-to-high transition is detected in the detection signal FCMP-H at time t4 in the jumping-up operation or in the detection signal FCMP-L at time t4 in the jumping-down operation.

The process waits in step S109 before performing the process in step S110 so as to prevent a spurious signal which may occur in the detection signal FCMP-H(L) immediately after the application of the kick signal from being mistaken, in step S110, for a correct low-to-high transition of the detection signal FCMP-H(L) at time t4 thereby improving the reliability of the focus jumping operation.

If in step S110 a low-to-high transition of the detection signal FCMP-H(L) is detected at time t4, then the process goes to step S111, and the system controller 10 outputs a threshold level control signal set to a level L3 depending on the jumping direction thereby changing the threshold values of the comparators 22 and 25. Then the process goes to step S112, and the system controller 10 controls the servo processor 14 so that a brake signal having a predetermined level depending on the jumping direction is applied to the focusing coil driver 16A. In the following step S113, the system controller 10 starts a timer which is provided for example in the system controller 10.

Because the timer is started when the brake signal is applied at time t4, the time counted by the timer indicates the length of time T which has elapsed from the low-to-high transition of the detection signal FCMP-H(L) at time t4, as shown in FIGS. 7–12.

Figure 14:
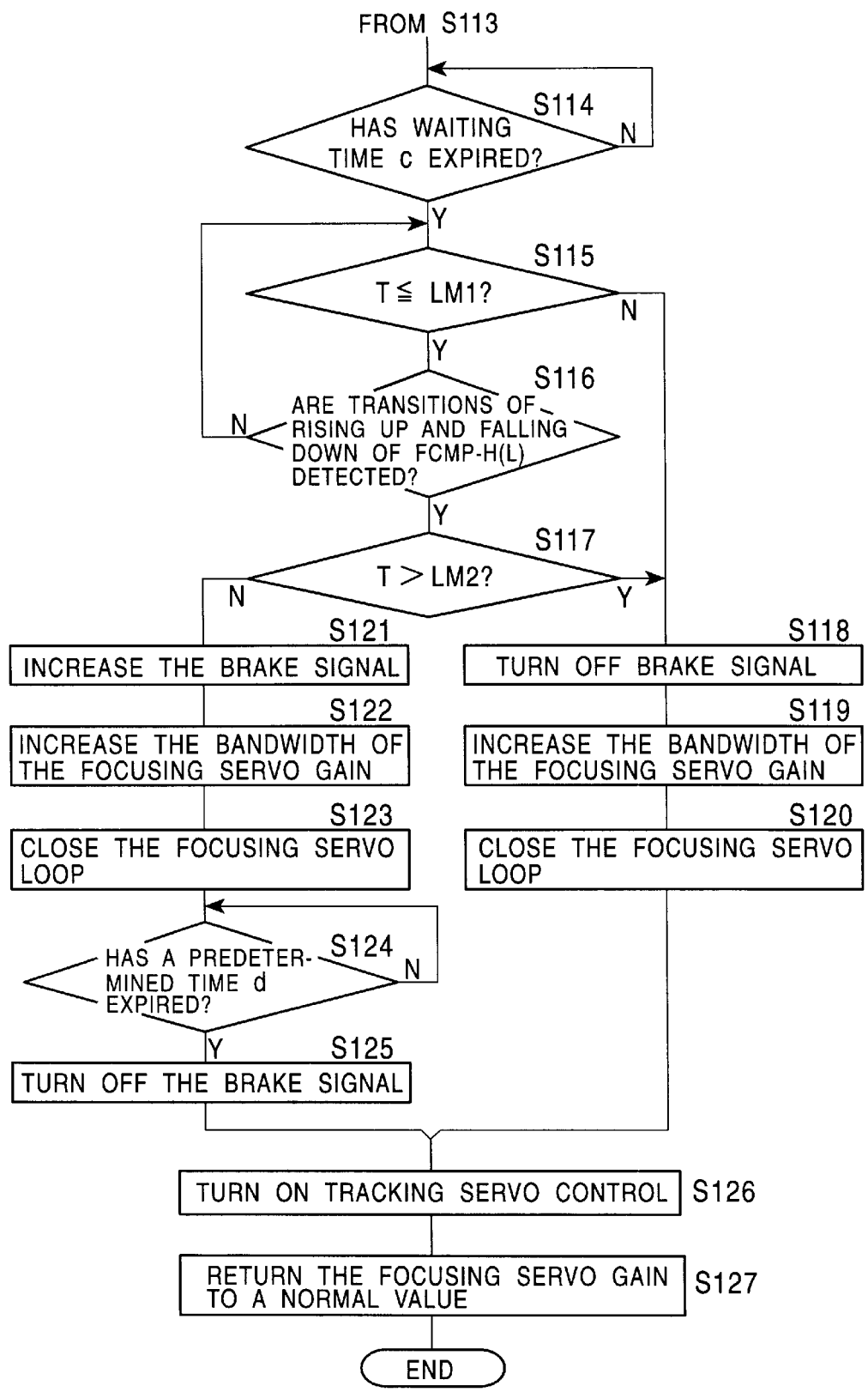
FIG. 14 is a flow chart illustrating the remaining part, continued from FIG. 13, of the first example of processing steps of the focus jumping operation according to an embodiment of the invention.

After completion of step 113, the process goes to step S114 shown in FIG. 14. After waiting for a predetermined length of time c in step S114, the process goes to step S115. In step S115 and in step S116 following that, the process waits until a high-to-low transition is detected in the detection signal FCMP-H(L) at time t5 before the time T counted by the timer exceeds a predetermined value LM1.

In the process in steps S115 and S116, if the high-to-low transition of the detection signal FCMP-H(L) is not detected by the time when the time T counted by the timer exceeds the predetermined value LM1, then the process goes to step S118. In the case where the process directly goes to step S118 from S115, the operation is performed in the forcibly-closed loop mode as shown in FIG. 8 or 11 although not described in further detail herein.

In steps S115 and S116, if the high-to-low transition of the detection signal FCMP-H(L) is detected, then the process goes to step S117.

In step S117, it is determined whether the current time (t5 at which the high-to-low transition of the detection signal FCMP-H(L) is detected) indicated by the timer is greater than a predetermined value LM2 (T>LM2). If T>LM2, then the process goes to step S118. The process goes to step S118 from S117 when the time T (from t4 to t5) counted by the timer satisfies the condition LM2<T<LM1. Thus, in this case, the following operation is performed in the normal mode as shown in FIG. 7 or 10.

On the other hand, if it is determined in step S117 that T>LM2 is not satisfied, then the process goes to step S121 to perform the operation in the increased brake signal mode.

In step S118, the brake signal is turned off. In the following step S119, the frequency bandwidth of the focusing servo gain is expanded by a predetermined amount, and then in step S120 the focusing servo loop is closed.

Figure 15:
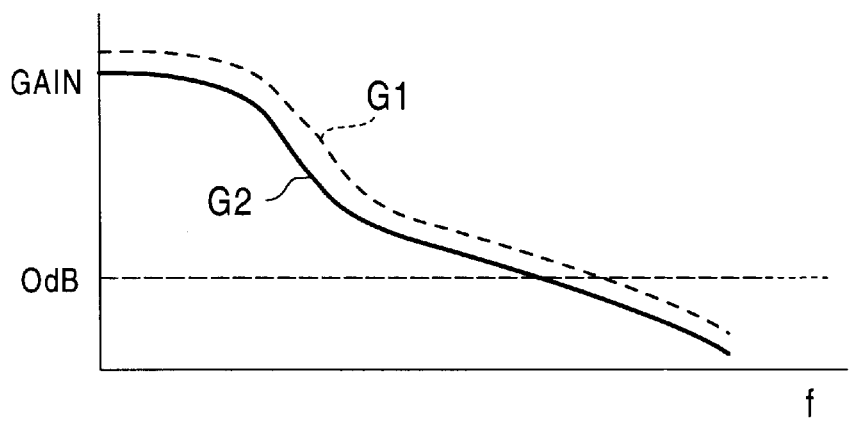
FIG. 15 is a graph illustrating examples of bandwidths of the focusing servo gain used in the embodiment of the invention.

The reason why the frequency bandwidth of the focusing servo gain is expanded in step S119 is to ensure that the objective lens 2 is drawn into the focus-drawing-in range associated with a desired signal layer when the focusing servo loop is closed in the following step S120 thereby ensuring that the objective lens 2 comes to the just focusing point associated with the desired layer in a short time. FIG. 15 illustrates an example of the focusing servo gain vs. frequency characteristic, wherein the normal characteristic is represented by a curve G2 (solid curve). In step S119, the parameters are changed so that the characteristic is changed to for example a curve G1 (broken curve).

The process performed in step S118 and the following steps corresponds to the process after time t5 shown in FIG. 7 or 10 in the case of the normal mode, or corresponds to the process after time t5 shown in FIG. 8 or 11 in the case of the forcibly-closed loop mode.

After completion of step S120, the process goes to step S126 in which the tracking servo loop is closed. Then in step S127, the frequency bandwidth of the focusing servo gain which was expanded in step S119 is returned to the normal bandwidth (for example to the characteristic represented by the curve G2 shown in FIG. 15) so that the focusing servo control can be performed in the normal fashion after the servo loop is closed.

In the case where the process goes to step S121, the operation mode is switched to the increased brake signal mode. That is, the brake signal is increased in level and is applied further. In the following step S122, the frequency bandwidth of the focusing servo gain is expanded by a predetermined amount and then in step S123 the focusing servo loop is closed. The process from S121 to S123 corresponds to the process performed at time t5 in FIG. 9 or 12.

Then in step S124, the process waits for a predetermined length of time d so that the additional brake signal which was started in step S121 is output for the period time equal to d. The period of time d corresponds to the period d from t5 to t6 in FIG. 9 or 12.

If expiration of the predetermined time d is detected in step S124 for example at time t6 in FIG. 9 or 12, then the process goes to step S125 and the brake signal which has been maintained at the on-level is turned off. Then steps S126 and S127 described above are performed.

Thus the focus jumping operation according to the present embodiment described above with reference to FIGS. 7–12 is accomplished in the steps described above.

In the above description, it is assumed that the timing of applying the kick signal and the brake signal is controlled by the system controller 10. Alternatively, the timing may be controlled by the servo processor 14. In this case, the system controller 10 sends a command to tell the servo processor 14 to perform the focus jumping operation. In response to the command, the servo processor 14 performs the focus jumping operation in accordance with the detection signals generated by the RF amplifier 9.

3.2 Second example of the focus jumping operation

In the first example of the focus jumping operation described above, the detection signals FCMP-H and FCMP-L are generated by comparing the waveform of the focusing error signal FE associated with a desired signal layer appearing between a zero-crossing time and the immediately previous zero-crossing time with the threshold levels (which are varied at predetermined times). The velocity of the objective lens 2 is determined on the basis of time information extracted from the pulse width of the detection signals FCMP-H and FCMP-L, and the focus jumping operation is performed in a proper mode (normal mode, forcibly-closed loop mode, increased brake signal mode) selected depending on the velocity of the objective lens 2.

In the second example of the focus jumping operation described below, differential information is produced by differentiating the waveform of the focusing error signal associated with a desired signal layer between a zero-crossing time and the immediately previous zero-crossing time, and the velocity of the objective lens 2 is determined from the differential information.

FIG. 16 illustrates an example of a circuit for obtaining the differential of the waveform of the focusing error signal FE.

Figure 16A:
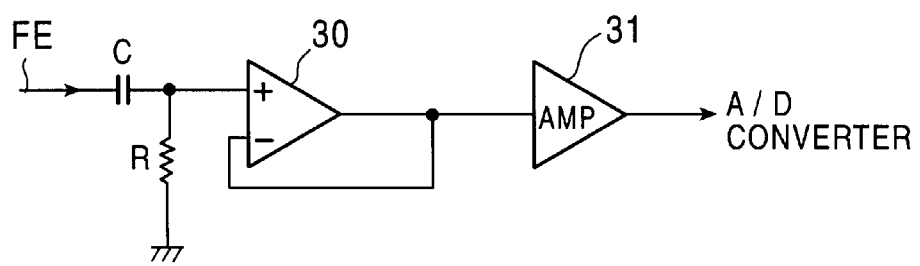
FIGS. 16A and 16B are block diagrams illustrating an example of a differentiating circuit for obtaining a differential of the waveform of a focusing error signal.

FIG. 16A illustrates a differentiating circuit comprising an operational amplifier 30, a resistor R, and a capacitor C. The focusing error signal FE is applied via a capacitor C to the noninverting input of the operational amplifier 30, and a differentiated waveform of the focusing error signal FE is output from the operational amplifier 30. The output signal of the operational amplifier 30 is applied to a buffer amplifier 31 and subjected to impedance conversion. The system controller 10 converts the output signal of the buffer amplifier 31 from analog to digital form thereby acquiring a digital signal.

Figure 16B:
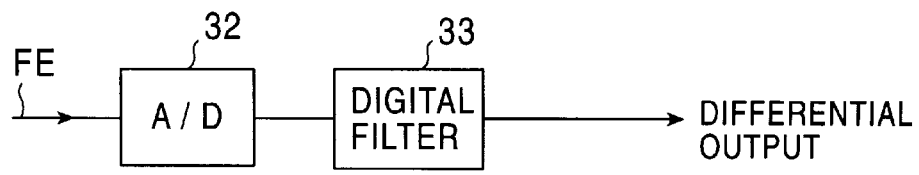

In alternative example shown in FIG. 16B, the focusing error signal FE is applied to an A/D (analog-to-digital) converter 32. The A/D converter 32 converts the received signal to a digital signal, which is in turn applied to a digital filter 33. The digital filter 33 performs signal-processing on the received signal in such a manner as to produce a differential, in the form of a digital signal, of the focusing error signal FE. The system controller 10 acquires the differential output of the digital filter 33. The example shown in FIG. 16B is particulary preferable when the disk drive in accordance with the present embodiment includes a digital signal processor, although not shown in FIG. 4. In this case, the digital filter provided in the digital signal processor may be used as the digital filter 33 described above.

The system controller 10 can obtain the information about the velocity of the objective lens 2 by processing the differential of the focusing error signal FE obtained by performing the above-described process. The process for obtaining the velocity information may be performed in various fashions, although all of them cannot be described herein. For example, the system controller 10 may extract the velocity of the objective lens 2 from a value obtained by integrating the differential of the focusing error signal FE for predetermined period of time as described later. Alternatively, the velocity of the objective lens 2 may also be obtained from the mean value of the differentials of the focusing error signal FE for a predetermined period of time. Still alternatively, the velocity of the objective lens 2 may also be determined from the differentials of the focusing error signals FE acquired at the predetermined times.

Herein the system controller 10 determine the velocity of the objective lens 2 from the differentials of the waveform of the focusing error signal FE, associated with the signal layer to which the focal point is to be jumped to, during the period (for example the period P shown in FIG. 7) from the zero-crossing time at t4 to the time at which the focusing waveform becomes maximum. This makes it possible to determine the correct operation mode at an earlier time on the basis of the information about the velocity of the objective lens 2 than with the technique described above in the first example of the focus jumping operation. As a result, it is possible to start the operation in the selected mode at an early time. This ensures that the focus jumping operation is performed in a more reliable fashion.

Figure 17:
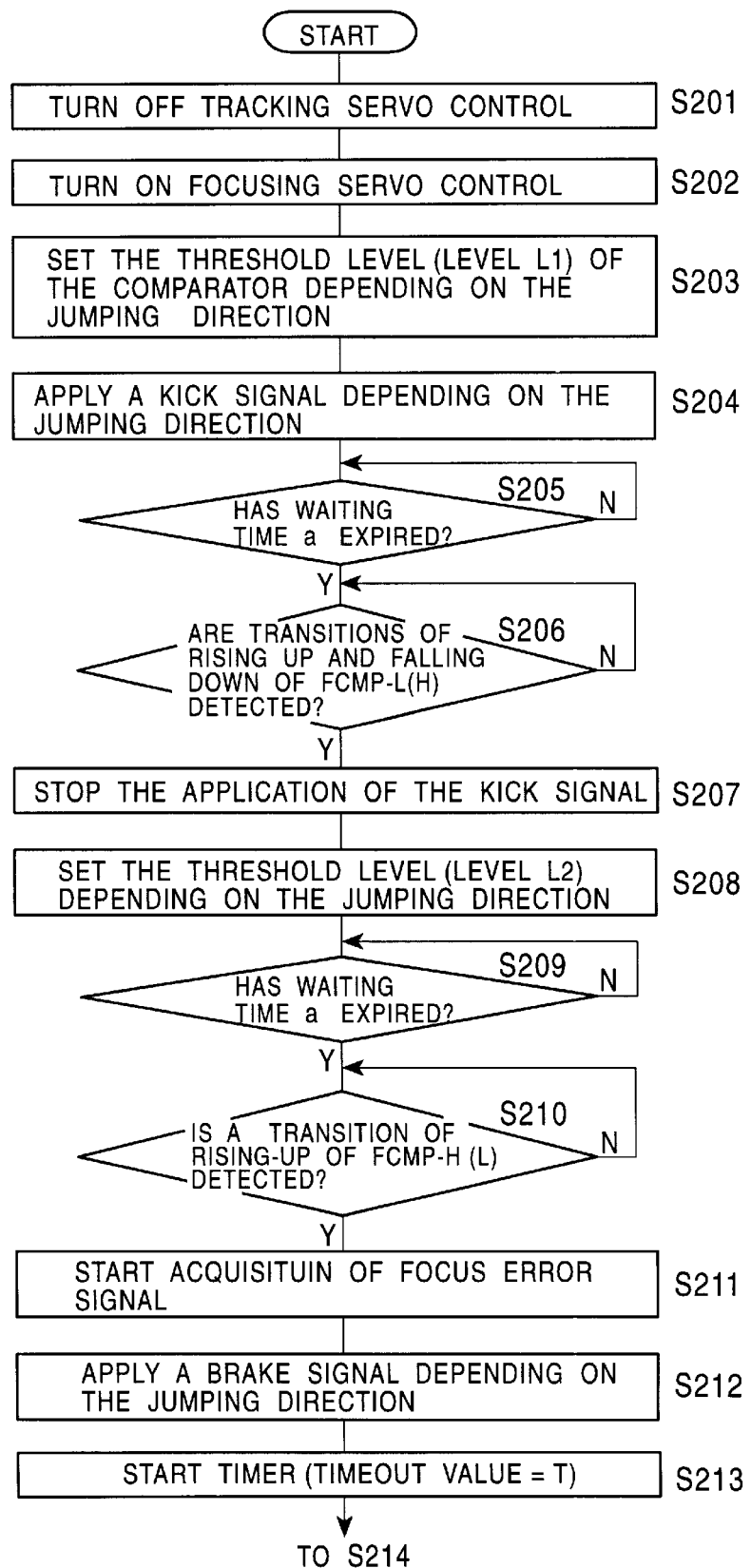
FIG. 17 is a flow chart illustrating a second example of processing steps of the focus jumping operation according to an embodiment of the invention.
Figure 18:
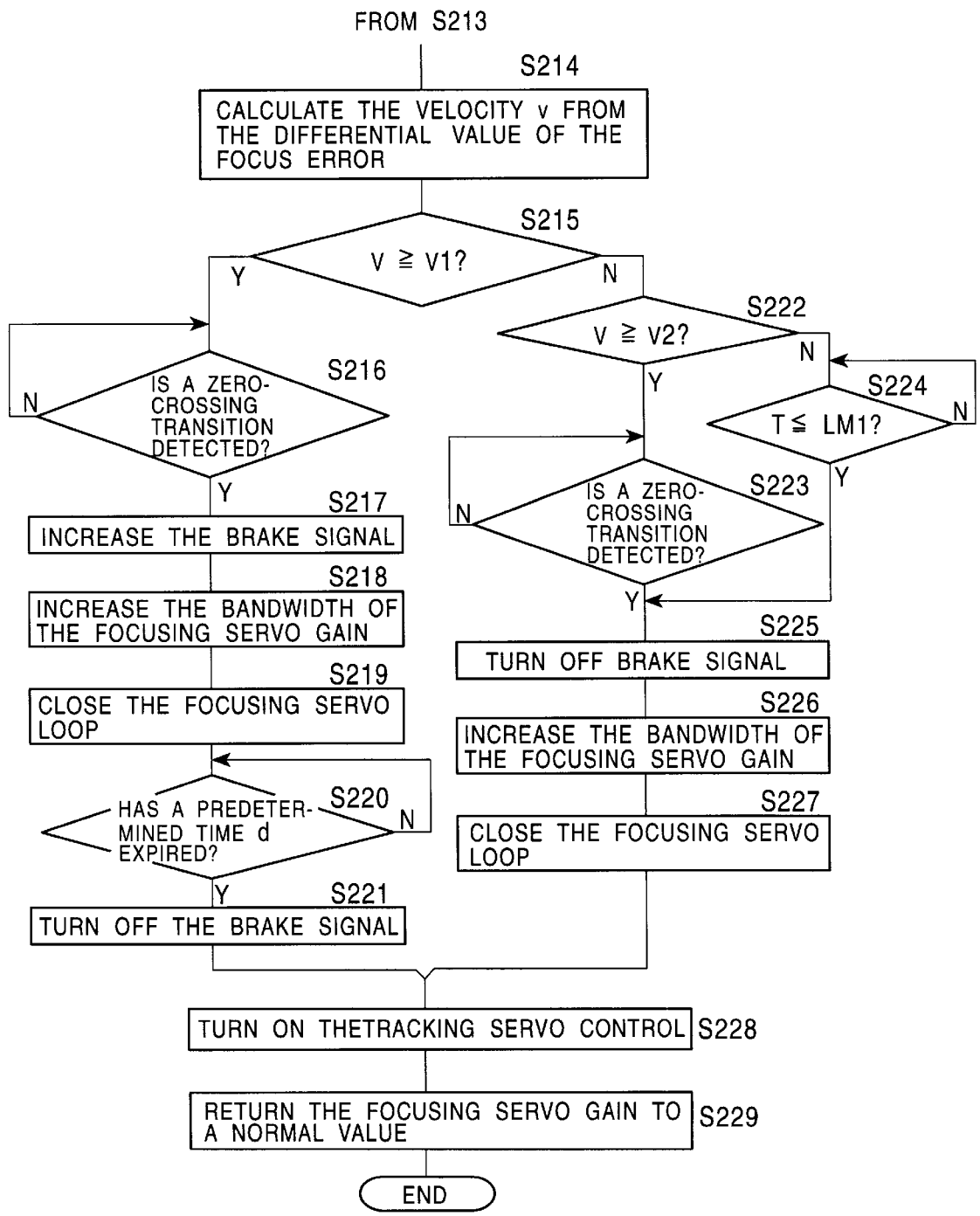
FIG. 18 is a flow chart illustrating the remaining part, continued from FIG. 17, of the second example of processing steps of the focus jumping operation according to an embodiment of the invention.

FIGS. 17 and 18 are flow charts illustrating the second example of the focus jumping operation. Steps from S201 to S210 in FIG. 17 are similar to those from S101 to S110 shown in FIG. 13, and thus they are not described in further detail herein.

Steps S211 to S213 are performed at time t3 described above. In step S211, to obtain the differential of the waveform of the focusing error signal FE during the period P, acquisition of the focusing error signal FE in the form of a digital signal or the differential of the waveform of the focusing error signal FE is started, wherein the acquisition of data may be performed for example in the manner described above with reference with FIG. 16. In the following step S212, a brake signal is output wherein the level and the polarity of the brake signal are determined depending on the jumping direction. Then in step S213, the counting operation of the timer is started.

After completion of step S213, the process goes to step S214 shown in FIG. 18. In step S214, the velocity v of the objective lens 2 is calculated from the differential of the waveform of the focusing error signal FE using the data acquired in step S211 wherein the velocity v represents the velocity of the objective lens 2 in the focusing direction for example during the period P shown in FIG. 7. In the calculation in step S214, if the mean value of the differentials of the focusing error signal FE acquired at predetermined times during the period P is obtained, then the mean velocity of the objective lens 2 during the period P can be obtained.

If the process in step S214 of calculating the velocity v during the period P from time t4 is completed, the process goes to step S215. In step S215, the system controller 10 determines whether the velocity v is equal to or greater than a predetermined value v1 (v$\geq$v1). If v$\geq$v1, that is, if the velocity of the objective lens 2 during the period P is equal to or greater than the value v1, then the process goes to step S216 to switch the operation mode to the forcibly-closed loop mode. In step S216, the process waits until zero-crossing occurs at time t5 in the focusing error signal FE. If the zero-crossing is detected, then the process goes to step S217. In the process in step S216, the zero-crossing may be detected by means of calculation using the data of velocity v. Alternatively, as in the first example of the operation, the zero-crossing may also be detected by monitoring the high-to-low transition of the detection signal FCMP-H(L) at time t5. In this case, after step S210, it is desirable to perform a process similar to that in step S111 shown in FIG. 13, thereby changing the threshold levels TH-H(L) of the comparators 22 and 25.

Step S217 and the following steps are performed in a similar manner to step S121 and steps following that shown in FIG. 14, and thus these steps are not described in further detail here.

Although the details of steps are not described here, the operation in the increased brake signal mode may also be performed in such a manner that the current value of the velocity v is determined in step S214 by integrating the differential of the focusing error signal FE, and, if v$\geq$v1, then an additional brake signal having a level determined depending on the velocity v is applied.

If it is determined in step S215 that v<v1, then the process goes to step S222. In step S222, it is determined whether the velocity v is equal to or greater than a predetermined value v2 (v2<v1). If v$\geq$v2, then v2$\leq$v$\leq$v1 holds and thus the velocity of the objective lens 2 is within the normal range. In this case, the process goes to step S223 to perform the operation in the normal mode. In step S223, the process waits until zero-crossing of the focusing error signal FE is detected at time t5. Then the process goes to step S225.

On the other hand, in the case where it is determined in step S222 that v$\geq$v2 does not hold, then the process goes to step S224 to perform the operation in the forcibly-closed loop mode. In step S224, the process waits until the expiration of time LM1 (refer to FIG. 8 or 11) from the time when the timer was started in step S213 is detected. Then the process goes to step S225.

The process in step S225 and steps following that is performed in a similar manner to that in step S118 and steps following that (FIG. 14) in the first example, and thus it is not described in further detail here.

In the focusing jumping operation according to the present embodiment, the conditions such as the timing of the respective processing steps may be determined depending on the specific application, and they are not limited to those described above. For example, although in the above embodiment the focus driving signal FDR is given in the order kick signal→pause→brake signal at the early stage of the operation of jumping the focal point of the objective lens 2 to a desired signal layer, the brake signal may be removed depending on the level of the kick signal, and the operation may be performed in a mode selected depending on the velocity of the objective lens 2.

Furthermore, although in the above embodiment, the focusing servo control apparatus is applied to the disk drive capable of reproducing data from a DVD-ROM of the two-layer disk type, it may also be applied to a disk drive capable of recording and reproducing data on and from a disk-shaped storage medium having a two-layer structure. Furthermore, the apparatus for controlling the focus jumping operation according to the present invention may also be applied to a disk-shaped storage medium having two or more layers which will be developed in the future.

As can be understood from the above description, the present invention has the advantage that in the disk drive which can accommodate a disk-shaped storage medium having a multilayer structure, when the focal point is jumped to a desired layer, the operation mode of the focus drawing-in process is switched depending on the velocity of the objective lens detected at a predetermined time before the focusing error signal crosses the zero level thereby ensuring that the focus jumping operation is performed in a highly-reliable fashion regardless of various factors such as the focusing direction and the direction of gravity which vary depending on the position in which the disk drive is placed, the sensitivity variation of the biaxial driving mechanism for driving the objective lens in the focusing direction and tracking direction, and the variation in the distance between layers of the multilayer disk.

What is claimed is:

1. An apparatus for reproducing data recorded on a disk-shaped storage medium including a plurality of signal layers, said apparatus being capable of switching the location of an objective lens through which a light beam is projected onto the disk-shaped storage medium, from a location where said objective lens focuses the light beam onto a first signal layer to a location where said objective lens focuses the light beam onto a second signal layer, said apparatus comprising:

movement control means for moving the objective lens by outputting a movement control signal having a predetermined level at a predetermined time so that the objective lens can reach a location within a range which allows the objective lens to be drawn to a just focusing position associated with the second signal layer;

velocity detection means for detecting the velocity of the objective lens from the waveform of a focusing error signal at a predetermined time prior to a zero-crossing time at which the objective lens is located at the just focusing position associated with the second signal layer; and focus drawing means for closing a focusing servo loop at a time corresponding to said velocity.

2. An apparatus according to claim 1, wherein:

in the case where the velocity of said objective lens is within a normal range, said focus drawing means closes the focusing servo loop and turns off said movement control signal at a time corresponding to said zero-crossing time;

in the case where the velocity of said objective lens is lower than the lower limit of the normal range, said focus drawing means closes the focusing servo loop and turns off said movement control signal when a predetermined length of time has elapsed from a predetermined time before the time corresponding to said zero-crossing time; and in the case where the velocity of said objective lens is higher than the upper limit of the normal range, said focus drawing means closes the focusing servo loop at the time corresponding to said zero-crossing time, and outputs a movement control signal having a predetermined level over a predetermined period of time thereby decelerating said objective lens.

3. An apparatus according to claim 1, wherein said velocity detection means detects the velocity of said objective lens on the basis of the period of time which ends at the time corresponding to said zero-crossing time of the focusing error signal and which begins at a time corresponding to the immediately previous zero-crossing time of the focusing error signal.

4. An apparatus according to claim 1, wherein said velocity detection means detects the velocity of said objective lens on the basis of differential information obtained by differentiating the waveform of the focusing error signal either during the period of time which ends at the tome corresponding to said zero-crossing time of the focusing error signal and which begins at a time corresponding to the immediately previous zero-crossing time of the focusing error signal or at a predetermined time during said period of time.

5. An apparatus for reproducing data recorded on a storage medium including a plurality of signal layers, said apparatus comprising:

moving means for moving an objective lens for focusing a laser beam onto the respective signal layers of said storage medium, in directions toward and away from said storage medium;

means for outputting a focusing error signal generated by detecting a laser beam reflected from the respective signal layers of said storage medium; and control means for controlling said moving means so that said objective lens is moved from a first location where said objective lens focuses the light beam onto a first signal layer of the storage medium to a second location where said objective lens focuses the light beam onto a second signal layer different from the first signal layer;

wherein said control means detects the velocity of said objective lens when said objective lens has come to a location near said second location on the basis of the focusing error signal generated during the movement of said objective lens from said first location to said second location, and said control means controls the timing of closing the focusing servo loop on the basis of said velocity.

6. An apparatus according to claim 5, wherein said control means supplies a kick signal to said moving mean depending on a positive or negative focusing error signal generated first during the movement of said objective lens from said first location to said second location, thereby moving said objective lens toward said second location, and then said control means supplies a brake signal having a polarity opposite to that of the kick signal to said moving means, depending on a second focusing error signal generated immediately after said first focusing error signal and having a polarity opposite to that of said first focusing error signal.

7. An apparatus according to claim 6, wherein on the basis of the period of time during which said second focusing error signal is output, said control means determines whether an additional brake signal having a level higher than the level of said brake signal should be applied to said moving means.

8. An apparatus according to claim 6, further comprising comparing means for comparing the focusing error signal with a threshold level thereby detecting the focusing error signal having a positive or negative polarity, wherein said control means changes said threshold level depending on the time when said focusing error signal is output.

9. An apparatus according to claim 6, wherein on the basis of the period of time during which said second focusing error signal is output, said control means determines whether the focusing servo loop should be closed.

10. An apparatus according to claim 6, wherein:

in the case where the velocity of said objective lens is within the normal range, said control means closes the servo loop at the time when the level of said second focusing error signal becomes zero;

in the case where the velocity of said objective lens is lower than the lower limit of the normal range, said control means closes the servo loop before the level of said second focusing error signal becomes zero; and in the case where the velocity of said objective lens is higher than the upper limit of the normal range, said control means closes the servo loop at the time when the level of said second focusing error signal becomes zero, and said control means further outputs an additional brake signal having a level higher than that of said brake signal during a predetermined period.

11. A method of switching the location of an objective lens through which a light beam is projected onto a disk-shaped storage medium including a plurality of signal layers, from a location where said objective lens focuses the light beam onto a first signal layer to a location where said objective lens focuses the light beam onto a second signal layer, said method comprising the steps of:

outputting a movement control signal having a predetermined level at a predetermined time thereby moving the objective lens toward a range in which the objective lens is allowed to be drawn to a just focusing position associated with the second signal layer;

detecting the velocity of the objective lens from the waveform of a focusing error signal at a predetermined time prior to a zero-crossing time at which the objective lens is located at the just focusing position associated with the second signal layer; and closing a focusing servo loop at a time corresponding to said velocity.

12. A method according to claim 11, wherein in said step of closing the focusing servo loop:

in the case where the velocity of said objective lens is within a normal range, the focusing servo loop is closed and said movement control signal is turned off at a time corresponding to said zero-crossing time;

in the case where the velocity of said objective lens is lower than the lower limit of the normal range, the focusing servo loop is closed and said movement control signal is turned off when a predetermined length of time has elapsed from a predetermined time before the time corresponding to said zero-crossing time; and in the case where the velocity of said objective lens is higher than the upper limit of the normal range, the focusing servo loop is closed at the time corresponding to said zero-crossing time, and a movement control signal having a predetermined level is output over a predetermined period of time thereby decelerating said objective lens.

* * * * *

UNITED STATES PATENT AND TRADEMARK OFFICE
CERTIFICATE OF CORRECTION

PATENT NO.: 6,061,310
DATED: May 9, 2000
INVENTOR(S): MICHIHIKO IIDA

It is certified that an error appears in the above-identified patent and that said Letters Patent is hereby corrected as shown below:

In Col. 26, line 1, please replace "tome" with --time--.

Signed and Sealed this

Twenty-fourth Day of April, 2001

Attest:

NICHOLAS P. GODICI

Attesting Officer     Acting Director of the United States Patent and Trademark Office